United States Patent
Kim et al.

(10) Patent No.: US 11,546,872 B2
(45) Date of Patent: *Jan. 3, 2023

(54) METHOD AND APPARATUS FOR REGISTERING WIRELESS DEVICE IN WIRELESS COMMUNICATION SYSTEM

(71) Applicant: Samsung Electronics Co., Ltd., Suwon-si (KR)

(72) Inventors: Dae-Dong Kim, Seongnam-si (KR); Hee-Dong Kim, Namyangju-si (KR); Yun-Ho Park, Suwon-si (KR); Kwan-Woo Song, Yongin-si (KR); Chung-Yong Eom, Seoul (KR); Dong-Ik Lee, Seongnam-si (KR); Ja-Iick Chun, Seoul (KR); Dong-Yun Hawng, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,812

(22) Filed: Sep. 6, 2019

(65) Prior Publication Data

US 2019/0394744 A1 Dec. 26, 2019

Related U.S. Application Data

(63) Continuation of application No. 16/368,031, filed on Mar. 28, 2019, which is a continuation of application (Continued)

(30) Foreign Application Priority Data

Jun. 12, 2013 (KR) .................... 10-2013-0067003

(51) Int. Cl.
*H04W 48/08* (2009.01)
*H04W 60/00* (2009.01)
(Continued)

(52) U.S. Cl.
CPC .......... *H04W 60/00* (2013.01); *H04W 8/005* (2013.01); *H04W 12/77* (2021.01); *H04W 48/08* (2013.01); *H04W 48/14* (2013.01)

(58) Field of Classification Search
None
See application file for complete search history.

(56) References Cited

U.S. PATENT DOCUMENTS

2005/0139680 A1 6/2005 Anttila et al.
2006/0208088 A1 9/2006 Sekiguchi
(Continued)

FOREIGN PATENT DOCUMENTS

CN 101855861 A 10/2010
CN 201725238 U 1/2011
(Continued)

OTHER PUBLICATIONS

European Search Report dated Mar. 11, 2019, issued in European Application No. 18214378.4-1215.
(Continued)

*Primary Examiner* — Kent Krueger
(74) *Attorney, Agent, or Firm* — Jefferson IP Law, LLP

(57) ABSTRACT

A method for registering a wireless device by a terminal in a wireless communication system is provided. The method includes obtaining connection information for the wireless device by scanning a recognition code of the wireless device in a first mode, transitioning to a second mode based on the connection information and receiving a connection request from the wireless device, performing a connection operation to the wireless device to transmit network access information to the wireless device, and transitioning to the first mode, and registering the wireless device upon detecting connection of the wireless device to a network in the first mode.

17 Claims, 19 Drawing Sheets

Related U.S. Application Data

No. 14/299,416, filed on Jun. 9, 2014, now Pat. No. 10,278,152.

(51) Int. Cl.
*H04W 8/00* (2009.01)
*H04W 48/14* (2009.01)
*H04W 12/77* (2021.01)

(56) References Cited

U.S. PATENT DOCUMENTS

| | | |
|---|---|---|
| 2010/0210238 A1 | 8/2010 | Cho et al. |
| 2010/0241857 A1 | 9/2010 | Okude et al. |
| 2011/0150266 A1 | 6/2011 | Hohndel |
| 2011/0156879 A1 | 6/2011 | Matsushita et al. |
| 2011/0289229 A1 | 11/2011 | Subramaniam |
| 2012/0173318 A1 | 7/2012 | Lee et al. |
| 2012/0199647 A1 | 8/2012 | Hwang et al. |
| 2012/0203673 A1 | 8/2012 | Morgan et al. |
| 2012/0278693 A1 | 11/2012 | Black et al. |
| 2012/0311165 A1 | 12/2012 | Renschler et al. |
| 2013/0046695 A1 | 2/2013 | Acosta-Cazaubon et al. |
| 2013/0081113 A1 | 3/2013 | Cherian et al. |
| 2013/0107806 A1 | 5/2013 | Lee et al. |
| 2013/0137373 A1 | 5/2013 | Choi et al. |
| 2013/0217359 A1 | 8/2013 | Cherian et al. |
| 2013/0223279 A1 | 8/2013 | Tinnakornsrisuphap et al. |
| 2013/0309971 A1 | 11/2013 | Kiukkonen et al. |
| 2014/0075039 A1 | 3/2014 | Yang et al. |
| 2014/0156081 A1 | 6/2014 | Ha |
| 2014/0197934 A1 | 7/2014 | Ha |
| 2014/0269646 A1 | 9/2014 | Ramasamy et al. |
| 2014/0304381 A1 | 10/2014 | Savolainen et al. |
| 2014/0362991 A1 | 12/2014 | Ebrom |

FOREIGN PATENT DOCUMENTS

| | | |
|---|---|---|
| CN | 102246468 A | 11/2011 |
| CN | 202679540 U | 1/2013 |
| CN | 202721770 U | 2/2013 |
| CN | 103139932 A | 6/2013 |
| JP | 2006-227764 A | 8/2006 |
| KR | 10-2007-0109350 A | 11/2007 |
| KR | 10-0933417 B1 | 12/2009 |
| KR | 10-2012-0090494 A | 8/2012 |
| KR | 10-2012-0138253 A | 12/2012 |
| KR | 10-2013-0013238 A | 2/2013 |
| KR | 10-2013-0021280 A | 3/2013 |
| KR | 2013-0021203 A | 3/2013 |
| WO | 2010/150505 A1 | 12/2010 |
| WO | 2011/139962 A1 | 11/2011 |
| WO | 2012/167200 A1 | 12/2012 |

OTHER PUBLICATIONS

Gitlin Richard et al., Two Hop Relay Architecture for Next Generation WWAN WLAN Integration, 4G Mobile Communications: Toward Open Wireless Architecture. NEC Laboratories America And Columbia University. pp. 24- 25. XP 11112447. Published on Aug. 16, 2004. IEEE Wireless Communications Apr. 2004.

Wi-Fi Alliance, Wi-Fi Simple Configuration Protocol and Usability Best Practices for the Wi-Fi Protected Setup Program; Apr. 2011; Version 2.0.1 (Year: 2011).

European Office Action dated Jul. 27, 2020, issued in European Patent Application No. 18214378.4.

Korean Office Action dated Mar. 29, 2021, issued in Korean Patent Application No. 10-2021-0016077.

U.S. Final Office Action dated Mar. 24, 2022, issued in U.S. Appl. No. 16/368,031.

Chinese Office Action dated Sep. 18, 2021, issued in Chinese Patent Application No. 201910856797.8.

METHOD AND APPARATUS FOR REGISTERING WIRELESS DEVICE IN WIRELESS COMMUNICATION SYSTEM

CROSS-REFERENCE TO RELATED APPLICATION(S)

This application is a continuation application of prior application Ser. No. 16/368,031, filed on Mar. 28, 2019, which is a continuation of prior application Ser. No. 14/299,416, filed on Jun. 9, 2014, which has issued as U.S. Pat. No. 10,278,152 on Apr. 30, 2019 and was based on and claimed the benefit under 35 U.S.C. § 119(a) of a Korean patent application filed on Jun. 12, 2013 in the Korean Intellectual Property Office and assigned Serial number 10-2013-0067003, the entire disclosure of each of which is hereby incorporated by reference.

TECHNICAL FIELD

The present disclosure relates to a method and apparatus for registering a wireless device in a wireless communication system.

BACKGROUND

In recent years, due to the increase in use of wireless communication, there is an increasing demand for connecting new wireless communication devices to the communication network. In addition, there is a need for temporary connection between wireless devices based on wireless communication technology, and in this case, pairing should be performed between the wireless devices.

In a related-art wireless communication system, the pairing may be performed by an application installation process and a device registration/authentication process according to the related art. The application installation process represents a process in which a user searches for and downloads an application for pairing, which is deployed by an operator, or downloads and installs a pairing application, which is provided from a separate provider.

The device registration/authentication process may include a process of recognizing a wireless device for pairing, with minimized power, registering the wireless device by receiving a personal identification number (PIN) code, blocking the registration of other wireless devices during pairing, and performing encrypted communication through the exchange of authentication keys. The device registration/authentication process will be described in detail below.

A wireless device used for registering devices (hereinafter referred to as a 'device registration-purpose wireless device') may perform registration for adjacent wireless devices in order to minimize transmit power. Therefore, the device registration-purpose wireless device should move to the place adjacent to the wireless device that the device registration-purpose wireless device will register, or a wireless device subject to the registration procedure should move to the place adjacent to the device registration-purpose wireless device. In this way, for pairing between two wireless devices, the two wireless devices should be placed adjacent to each other by the user. Therefore, the existing device registration method may be limited to the user-dependent method because the user's active involvement is required.

If the two wireless devices exist in the adjacent places, a communication environment for communication between the two wireless devices may be provided, and a PIN code may be used for encrypted communication. The device registration-purpose wireless device may provide a PIN code that is randomly generated, or provided from an associated system, to a relevant wireless device, and determine the wireless device to which a PIN code corresponding to the provided PIN code is applied, as a wireless device that the device registration-purpose wireless device will register, thereby performing the registration procedure.

When performing the registration procedure, the device registration-purpose wireless device may block any devices from involvement in the registration during the registration procedure by ignoring all the other adjacent devices for a period of a preset time.

For security, two wireless devices, which are not open before pairing, may exchange keys needed for authentication using separate wired communication (e.g., universal asynchronous receiver/transmitter (UART) communication or the like) and closed wireless communication (e.g., infrared data association (IrDA) communication or the like), and then, perform a registration procedure through an authentication process. The two wireless devices may perform the registration procedure through encrypted security communication, using Peer-to-Peer (P2P) communication of near field communication (NFC).

In this pairing scheme, even though pairing is normally performed, another wireless device adjacent to the device registration-purpose wireless device is likely to be registered, instead of the wireless device that the user desires to register. In addition, the pairing scheme may undergo complicated pairing settings, because application installation and device registration should be separately performed, instead of being performed as one process, and identifiers (IDs) and passwords for multiple items are required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for registering a wireless device in a wireless communication system.

Another aspect of the present disclosure is to provide a wireless device registration method and apparatus for reducing a registration time and simplifying a registration procedure for a wireless device.

Another aspect of the present disclosure is to provide a method and apparatus for allowing a desired wireless device to be securely registered without involvement of another wireless device.

In accordance with an aspect of the present disclosure, a method for registering a wireless device by a terminal in a wireless communication system is provided. The method includes obtaining connection information for the wireless device by scanning a recognition code of the wireless device in a first mode, transitioning to a second mode based on the connection information and receiving a connection request from the wireless device, performing a connection operation to the wireless device to transmit network access information to the wireless device, and transitioning to the first mode, and registering the wireless device upon detecting connection of the wireless device to a network in the first mode.

In accordance with another aspect of the present disclosure, a method for registering a wireless device by a terminal in a wireless communication system is provided. The method includes obtaining connection information for the wireless device by scanning a recognition code of the wireless device, detecting an intermediate node connecting with a communication network between the terminal and the wireless device, based on the connection information, transmitting information for connection to the wireless device to the intermediate node, the information being included in the connection information, and registering the wireless device upon receiving information indicating connection to the wireless device, from the intermediate node.

In accordance with further another aspect of the present disclosure, a terminal for registering a wireless device in a wireless communication system is provided. The terminal includes a wireless unit, a recognition code scanner configured to obtain connection information for the wireless device by scanning a recognition code of the wireless device in a first mode, and a controller configured to transition to a second mode based on the connection information, to control the wireless unit to receive a connection request from the wireless device, to perform a connection operation to the wireless device to transmit network access information to the wireless device, to transition to the first mode, and to register the wireless device upon detecting connection of the wireless device to a network in the first mode.

In accordance with yet another aspect of the present disclosure, a terminal for registering a wireless device in a wireless communication system is provided. The terminal includes a wireless unit, a recognition code scanner configured to obtain connection information for the wireless device by scanning a recognition code of the wireless device, and a controller configured to detect an intermediate node connecting with a communication network between the terminal and the wireless device, based on the connection information, to control the wireless unit to transmit information for connection to the wireless device to the intermediate node, the information being included in the connection information, and to register the wireless device upon receiving information indicating connection to the wireless device, from the intermediate node.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain y embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
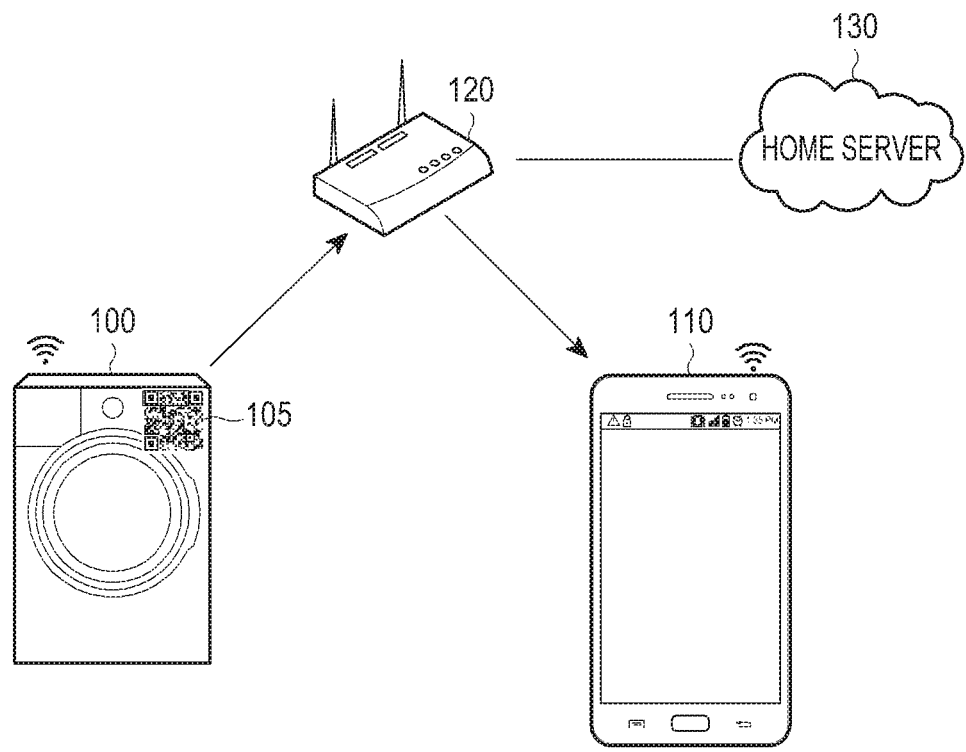
FIG. 1 illustrates a wireless communication system according to a first embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

An aspect of the present disclosure provides a method and apparatus for registering a wireless device in a wireless communication system. The present disclosure provides the following four possible embodiments depending on the type of the wireless communication used by a wireless device and a terminal. In a first embodiment of the present disclosure, a terminal performing wireless fidelity (Wi-Fi) communication may register a wireless device performing Wi-Fi communication based on a tethering mode. In a second embodiment of the present disclosure, a terminal performing Wi-Fi communication may register a wireless device performing Wi-Fi communication by performing peer-to-peer (P2P) communication with the wireless device. In a third embodiment of the present disclosure, a terminal performing Wi-Fi communication may register a wireless device performing Zigbee communication. In a fourth embodiment of the present disclosure, a terminal performing Wi-Fi communication may register a wireless device performing Z-wave communication.

The wireless device proposed in the first to fourth embodiments of the present disclosure may include home appliances capable of wireless communication, such as washing machines, refrigerators, televisions and the like. The terminal proposed in the first to fourth embodiments of the present disclosure may include cellular phones, tablet personal computers (PCs) and the like, all of which are capable of wireless communication. However, the wireless device and the terminal may not be limited to the above devices, and may include any other devices.

Each of the four embodiments of the present disclosure will now be detailed in detail.

FIG. 1 illustrates a wireless communication system according to a first embodiment of the present disclosure.

Referring to FIG. 1, the wireless communication system according to the first embodiment of the present disclosure may be configured in the form of a home network, which includes a wireless device 100, a terminal 110, an access point (AP) 120, a home server 130, and may include other similar and/or suitable devices.

The wireless device 100 may perform Wi-Fi communication, and include a recognition code including device information and the like. The recognition code may be a 2-dimensional (2D) recognition code. The recognition code 105 may correspond to, for example, a quick response (QR) code 105 and the like, and for convenience of description, the recognition code will be referred to herein as a QR code 105.

In the first embodiment of the present disclosure, the QR code 105 may include connectivity type information indicating the wireless communication type such as Wi-Fi and the like, information about the operation mode that the terminal 110 should enter in a registration process, a Wi-Fi medium access control (MAC) address, a service set identifier (SSID) and a password, which are used for tethering a connection, uniform resource identifier (URI) information for download of an application, and the like. The above information may be encrypted and then stored in the QR code 105, and the URI information may be recorded in accordance with the QR standard.

The terminal 110, a device capable of performing Wi-Fi communication, may obtain information included in the QR code 105 by scanning the QR code 105. The terminal 110 may enter the tethering mode based on the information obtained from the QR code 105, making it possible to perform a registration procedure for the wireless device 100.

The AP 120 may be connected to the home server 130 and perform communication with the external network. For example, if the terminal 110 transmits URI information, the AP 120 may deliver an application corresponding to the URI to the terminal 110.

The home server 130 may be connected to the external network and the AP 120, and manage information about a variety of devices in the home network.

Figure 2:
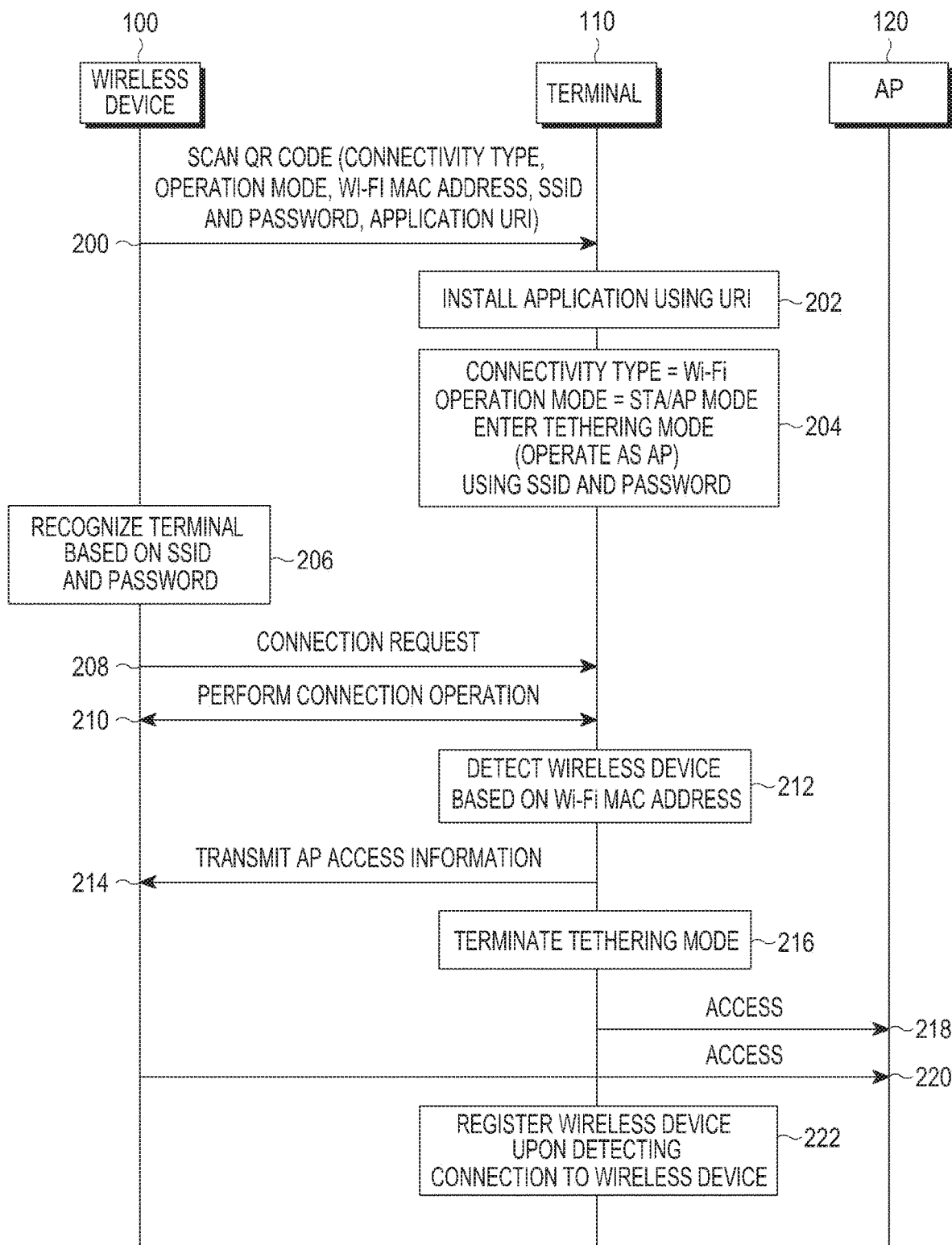
FIG. 2 is a signaling diagram illustrating a process of registering a wireless device in a wireless communication system according to the first embodiment of the present disclosure.

Reference will now be made to FIG. 2, to describe a process of registering a wireless device in the wireless communication system illustrated in FIG. 1.

FIG. 2 is a signaling diagram illustrating a process of registering a wireless device in a wireless communication system according to the first embodiment of the present disclosure.

Referring to FIG. 2, in operation 200, the terminal 110 may obtain information about connectivity type, operation mode, Wi-Fi MAC address, SSID, password, application URI and the like by scanning the QR code 105 included in the wireless device 100. In operation 202, the terminal 110 may download and install an application using the URI information. The application may correspond to an application used for searching for and registering of the wireless device 100, and the terminal 110 may download the application through the AP 120.

The terminal 110 may execute the application and determine the connectivity type and operation mode included in the QR code 105. In operation 204, the terminal 110 may enter the tethering mode based on the SSID and password, if it is determined that the connectivity type corresponds to Wi-Fi and the operation mode is a station (STA)/AP mode (in which a terminal (or a station) operates as an AP, and a wireless device operates as a terminal for the AP, thereby performing a registration mode). The terminal 110 may start operating as an AP.

In operation 206, the wireless device 100 may recognize the terminal 110 that operates as an AP. For example, the wireless device 100 may recognize the terminal 110 as an AP that has the same SSID and password as the SSID and password included in the QR code, through a periodic AP scan process. The wireless device 100 may recognize the terminal 110 by determining that the terminal 110 is adjacent to the wireless device 100, by means of a proximity sensor or the like.

Upon recognizing the terminal 110, the wireless device 100 may transmit a connection request message to the terminal 110 in operation 208. Herein, although the wireless device 100 may transmit the connection request message immediately after recognizing the terminal 110, the wireless device 100 may transmit the connection request message by receiving a separate input from a user after informing the user of its recognition of the terminal 110 using a display, a voice sign or the like.

Upon receiving the connection request message, the terminal 110 may perform a Wi-Fi connection operation to the wireless device 100 in operation 210. The terminal 110 may be connected not only to the wireless device 100 but also to a plurality of wireless devices, since the terminal 110 operates as an AP. Therefore, the terminal 110 should detect the wireless device 100 that the terminal 110 desires to register, among the plurality of wireless devices connected to the terminal 110. To this end, in operation 212, the terminal 110 may detect the wireless device 100 among the plurality of wireless devices connected to the terminal 110, based on the Wi-Fi MAC address.

For example, the terminal 110 may broadcast a request signal for discovery of a wireless device to the plurality of wireless devices using a simple service discovery protocol (SSDP)/multicast domain name system (mDNS) or another discovery protocol, and then receive a response signal thereto. The terminal 110 may detect, as the wireless device 100, the wireless device that has transmitted a response signal including the same Wi-Fi MAC address as the Wi-Fi MAC address that the terminal 110 knows.

Upon detecting the wireless device 100, the terminal 110 may encrypt AP access information including the information needed for an access to the AP 120, and transmit the encrypted AP access information to the wireless device 100 in operation 214. In operation 216, the terminal 110 may terminate the tethering mode. Although the terminal 110 may terminate the tethering mode immediately after transmitting the AP access information, the terminal 110 may terminate the tethering mode after receiving a signal indicating the reception of the access information of the AP 120, from the wireless device 100.

After terminating the tethering mode, the terminal 110 may access again the AP 120 in operation 218. In operation 220, the wireless device 100 may access the AP 120 based on the AP access information received from the terminal 110. The wireless device 100 may transmit its own information to the AP 120. Then, the AP 120 may transmit the information about the wireless device 100 to the home server 130 so that the information about the wireless device 100 may be registered in the home network.

The terminal 110 may detect wireless devices connected to the home network, using the SSDP/mDNS or another discovery protocol. The terminal 110 may allow the user to select at least one of the detected wireless devices by displaying information about the detected wireless devices on the screen. If the user selects the wireless device 100, the terminal 110 may transmit a pairing request to the wireless device 100 and receive a response signal thereto. In operation 222, upon detecting the connection to the wireless device 100, the terminal 110 may perform registration for the wireless device 100.

Next, reference will be made to FIGS. 3 and 4, to describe operations of the terminal 110 and the wireless device 100 according to the first embodiment of the present disclosure, respectively.

Figure 3:
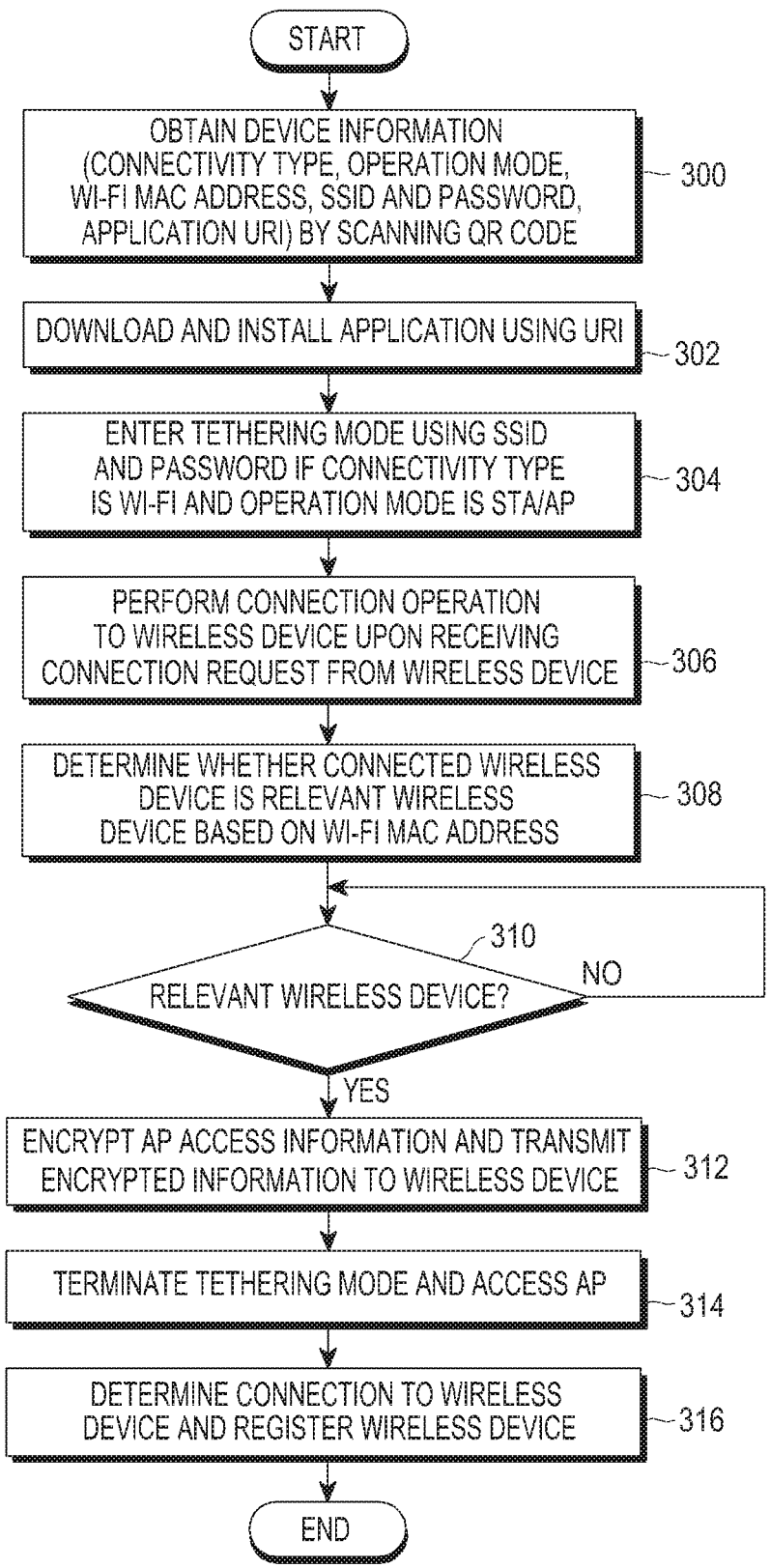
FIG. 3 is a flowchart illustrating an operation of a terminal according to the first embodiment of the present disclosure.

FIG. 3 is a flowchart illustrating an operation of a terminal according to the first embodiment of the present disclosure.

Referring to FIG. 3, in operation 300, the terminal 110 may obtain device information (e.g., connectivity type, operation mode, Wi-Fi MAC address, SSID, password, application URI and the like) by scanning the QR code 105 of the wireless device 100. In operation 302, the terminal 110 may download and install an application using the URI.

In operation 304, the terminal 110 may execute the application, and if the connectivity type corresponds to Wi-Fi and the operation mode is the STA/AP mode, the terminal 110 may enter the tethering mode using the SSID and password. In operation 306, upon receiving a connection request from the wireless device 100 while the terminal 110 operates as an AP in the tethering mode, the terminal 110 may perform a connection operation to the wireless device 100. In operation 308, the terminal 110 may determine whether the connected wireless device is a relevant wireless device (e.g., the wireless device 100) based on the Wi-Fi MAC address, because the terminal 110 may be connected not only to the wireless device 100 but also to another wireless device.

If it is determined in operation 310 that the connected wireless device 100 is the relevant wireless device, the terminal 110 may encrypt AP access information and transmit the encrypted AP access information to the wireless device 100 in operation 312. In operation 314, the terminal 110 may terminate the tethering mode and access the AP 120.

The terminal 110 may detect wireless devices connected to the home network using the SSDP/mDNS or another discovery protocol. The terminal 110 may allow the user to select at least one of the detected wireless devices by displaying information about the detected wireless devices on the screen.

If the user selects the wireless device 100, the terminal 110 may transmit a pairing request to the wireless device 100, and receive a response signal thereto. In operation 316, the terminal 110 may determine its connection to the wireless device 100 and register the wireless device 100.

Figure 4:
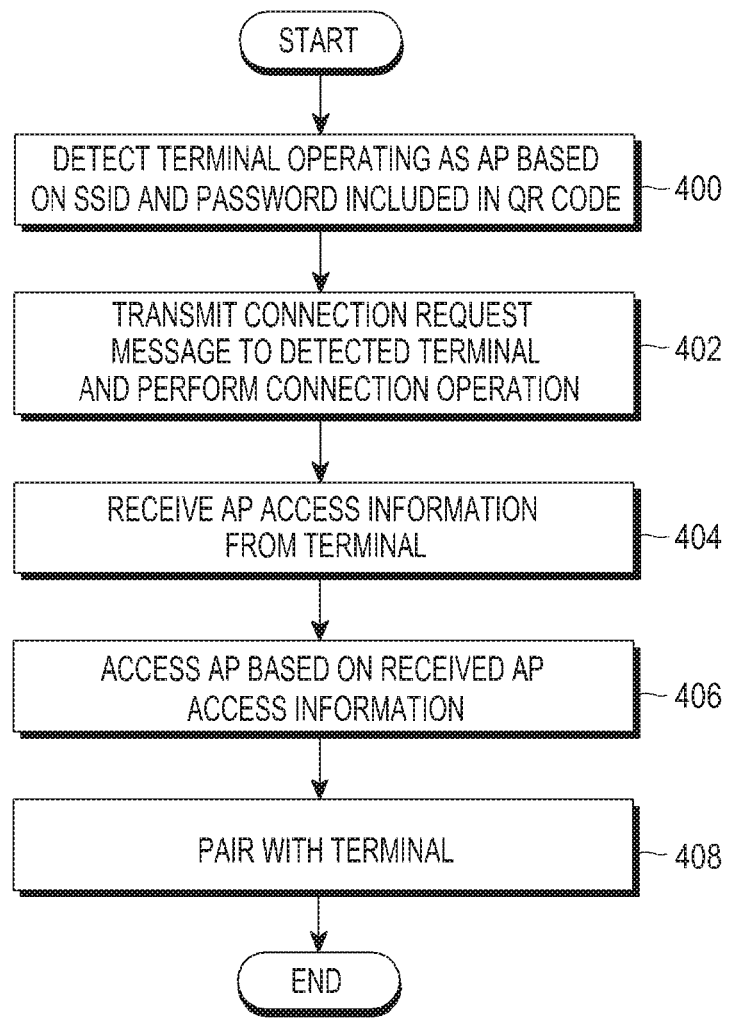
FIG. 4 is a flowchart illustrating an operation of a wireless device according to the first embodiment of the present disclosure.

FIG. 4 is a flowchart illustrating an operation of a wireless device according to the first embodiment of the present disclosure.

Referring to FIG. 4, in operation 400, the wireless device 100 may detect the terminal 110 operating as an AP, based on the SSID and password included in the QR code 105. The wireless device 100 may detect the terminal 110 as an AP that has the same SSID and password as the SSID and password included in the QR code 105, through a periodic AP scan process. After determining that a specific terminal is adjacent to the wireless device 100 by means of a proximity sensor or the like, the wireless device 100 may detect or discover the terminal 110 by determining whether the specific terminal is the terminal 110 based on the SSID and password included in the QR code 105.

In operation 402, the wireless device 100 may transmit a connection request message to the detected terminal 110 and perform a connection operation. Upon receiving a request signal for discovery from the terminal 110, the wireless device 100 may transmit the Wi-Fi MAC address included in the QR code 105 using a response signal, allowing the terminal 110 to detect the wireless device 100.

After performing the above process, upon receiving AP access information from the terminal 110 in operation 404, the wireless device 100 may access the AP 120 based on the received AP access information in operation 406. The wireless device 100 may transmit its own information to the AP 120 so that the wireless device 100 may be registered in the home network. Upon receiving a pairing request by the terminal 110, the wireless device 100 may pair with the terminal 110 in operation 408.

Next, a description will be made of the second embodiment of the present disclosure, in which a terminal performing Wi-Fi communication registers a wireless device performing Wi-Fi communication by performing P2P communication with the wireless device.

Figure 5:
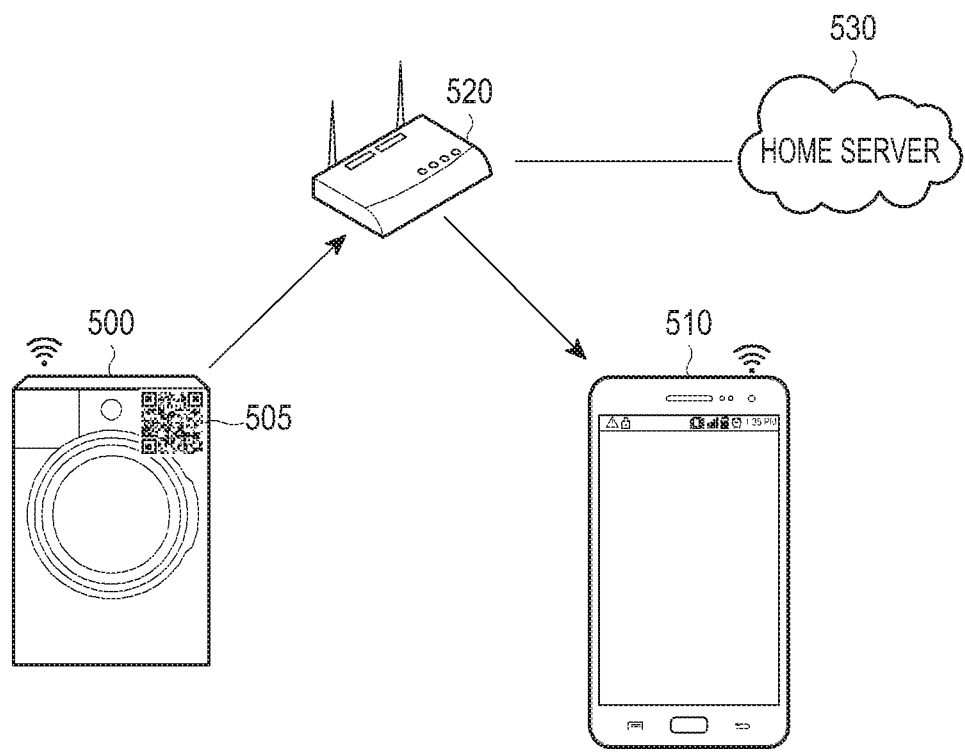
FIG. 5 illustrates a wireless communication system according to a second embodiment of the present disclosure.

FIG. 5 illustrates a wireless communication system according to a second embodiment of the present disclosure.

Referring to FIG. 5, the wireless communication system according to the second embodiment of the present disclosure may be configured in the form of a home network, which includes a wireless device 500, a terminal 510, an AP 520, a home server 530, and may include other similar and/or suitable devices.

The wireless device 500 may perform Wi-Fi communication, and include a recognition code including device information and the like. The recognition code may be a 2D recognition code. The recognition code may correspond to, for example, a QR code 505 and the like, and for convenience of description, the recognition code will be referred to herein as a QR code 505.

In the second embodiment of the present disclosure, the QR code 505 may include connectivity type information indicating the wireless communication type such as Wi-Fi and the like, information about the operation mode that the terminal 510 should enter in a registration process, a Wi-Fi MAC address, a P2P personal identification number (PIN) code used to perform P2P communication, URI information for download of an application, and the like. The above information may be encrypted and then stored in the QR code 505, and the URI information may be recorded in accordance with the QR standard.

The terminal 510, a device capable of performing Wi-Fi communication, may obtain information included in the QR code 505 by scanning the QR code 505. The terminal 510 may perform a registration procedure for the wireless device 500 by performing P2P communication with the wireless device 500 based on the information obtained from the QR code 505.

The AP 520 may be connected to the home server 530 and perform communication with the external network. For example, if the terminal 510 transmits URI information, the AP 520 may deliver an application corresponding to the URI to the terminal 510.

The home server 530 may be connected to the external network and the AP 520, and manage information about a variety of devices in the home network.

Figure 6:
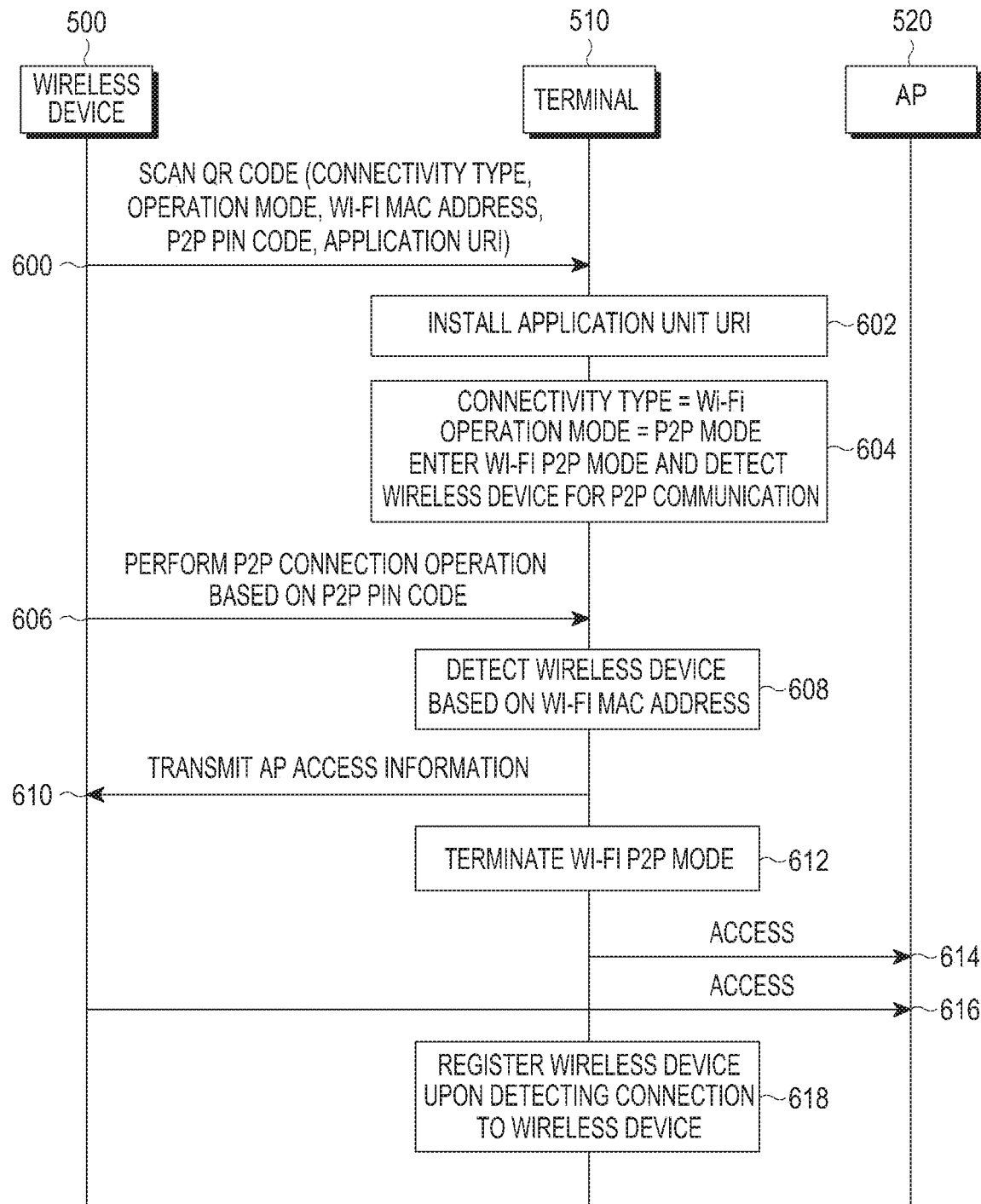
FIG. 6 is a signaling diagram illustrating a process of registering a wireless device in a wireless communication system according to the second embodiment of the present disclosure.

Reference will now be made to FIG. 6, to describe a process of registering a wireless device in the wireless communication system illustrated in FIG. 5.

FIG. 6 is a signaling diagram illustrating a process of registering a wireless device in a wireless communication system according to the second embodiment of the present disclosure.

Referring to FIG. 6, in operation 600, the terminal 510 may obtain information about connectivity type, operation mode, Wi-Fi MAC address, P2P PIN code, application URI and the like by scanning the QR code 505 included in the wireless device 500. In operation 602, the terminal 510 may download and install an application using the URI information. The application may correspond to an application used for searching for and registering of the wireless device 500, and the terminal 510 may download the application through the AP 520.

The terminal 510 may execute the application and determine the connectivity type and operation mode included in the QR code 505. In operation 604, the terminal 510 may enter a Wi-Fi P2P mode by turning on a Wi-Fi interface, if it is determined that the connectivity type corresponds to Wi-Fi and the operation mode is the P2P mode (in which a terminal performs a registration procedure by performing P2P communication with a wireless device). The terminal 510 may detect at least one wireless device for P2P communication, and perform a P2P connection operation based on the P2P PIN code in operation 606.

Specifically, the terminal 510 may broadcast a request signal for discovery of a wireless device, and then receive a response signal thereto. The terminal 510 may detect the wireless device that has transmitted the response signal, as a wireless device for P2P communication in operation 608. The terminal 510 may detect, as a wireless device for P2P communication, the wireless device that has transmitted the same P2P PIN code as the obtained P2P PIN code, among the wireless devices that have transmitted the response signal, and perform a connection operation to the wireless device for P2P communication. The P2P PIN code may be transmitted together with the response signal, or transmitted in a separate signal from the at least one wireless device. Here, the terminal 510 may determine whether the connected wireless device is the wireless device 500, based on the Wi-Fi MAC address. In other words, the terminal 510 may determine, as the wireless device 500, the wireless device that has the same Wi-Fi MAC address as the Wi-Fi MAC address that the terminal 510 knows.

If the connected wireless device is determined to be the wireless device 500, the terminal 510 may encrypt AP access information for the AP 520 and transmit the encrypted AP access information to the wireless device 500 in operation 610. In operation 612, the terminal 510 may terminate the Wi-Fi P2P mode and turn off the Wi-Fi interface. Although not illustrated in FIG. 6, the terminal 510 may terminate the P2P mode after receiving a signal indicating the reception of the AP access information from the wireless device 500.

After the termination of the P2P mode, the terminal 510 may access again the AP 520 in operation 614. In operation 616, the wireless device 500 may access the AP 520 based on the AP access information received from the terminal 510. The wireless device 500 may transmit its own information to the AP 520. Then, the AP 520 may transmit the information about the wireless device 500 to the home server 530 so that the information about the wireless device 500 may be registered in the home network.

The terminal 510 may detect wireless devices connected to the home network, using the SSDP/mDNS or another discovery protocol. The terminal 510 may allow the user to select at least one of the detected wireless devices by displaying information about the detected wireless devices on the screen. If the user selects the wireless device 500, the terminal 510 may transmit a pairing request to the wireless device 500 and receive a response signal thereto. In operation 618, upon detecting the connection to the wireless device 500, the terminal 510 may perform registration for the wireless device 500.

Next, reference will be made to FIGS. 7 and 8, to describe operations of the terminal 510 and the wireless device 500 according to the second embodiment of the present disclosure, respectively.

Figure 7:
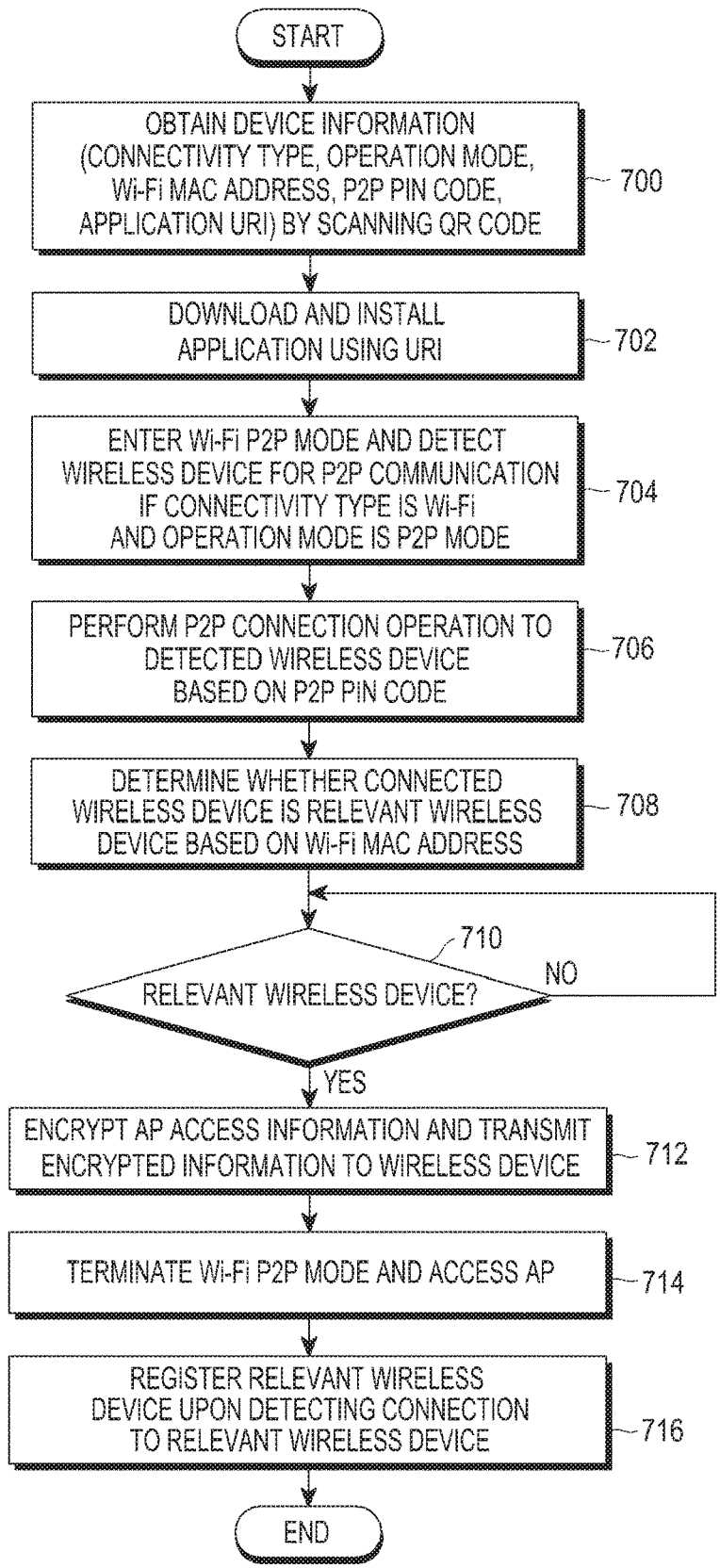
FIG. 7 is a flowchart illustrating an operation of a terminal according to the second embodiment of the present disclosure.

FIG. 7 is a flowchart illustrating an operation of a terminal according to the second embodiment of the present disclosure.

Referring to FIG. 7, in operation 700, the terminal 510 may obtain device information (e.g., connectivity type, operation mode, Wi-Fi MAC address, P2P PIN code, application URI and the like) by scanning the QR code 505 of the wireless device 500. In operation 702, the terminal 510 may download and install an application using the URI.

In operation 704, the terminal 510 may execute the application, and enter the Wi-Fi P2P mode and detect a wireless device for P2P communication, if the connectivity type corresponds to Wi-Fi and the operation mode is the P2P mode. In operation 706, the terminal 510 may perform a P2P connection operation to the detected wireless device based on the P2P PIN code.

In operation 708, the terminal 510 may determine whether the detected wireless device is the relevant wireless device 500, based on the Wi-Fi MAC address. If it is determined in operation 710 that the detected wireless device is the relevant wireless device 500, the terminal 510 may encrypt AP access information and transmit the encrypted AP access information to the wireless device 500 in operation 712. In operation 714, the terminal 510 may terminate the Wi-Fi P2P mode and access the AP 520.

The terminal 510 may detect wireless devices connected to the home network, using the SSDP/mDNS or another discovery protocol. The terminal 510 may allow the user to select at least one of the detected wireless devices by displaying information about the detected wireless devices on the screen.

If the user selects the wireless device 500, the terminal 510 may transmit a pairing request to the wireless device 500 and receive a response signal thereto. In operation 716, upon detecting the connection to the wireless device 500, the terminal 510 may perform registration for the wireless device 500.

Figure 8:
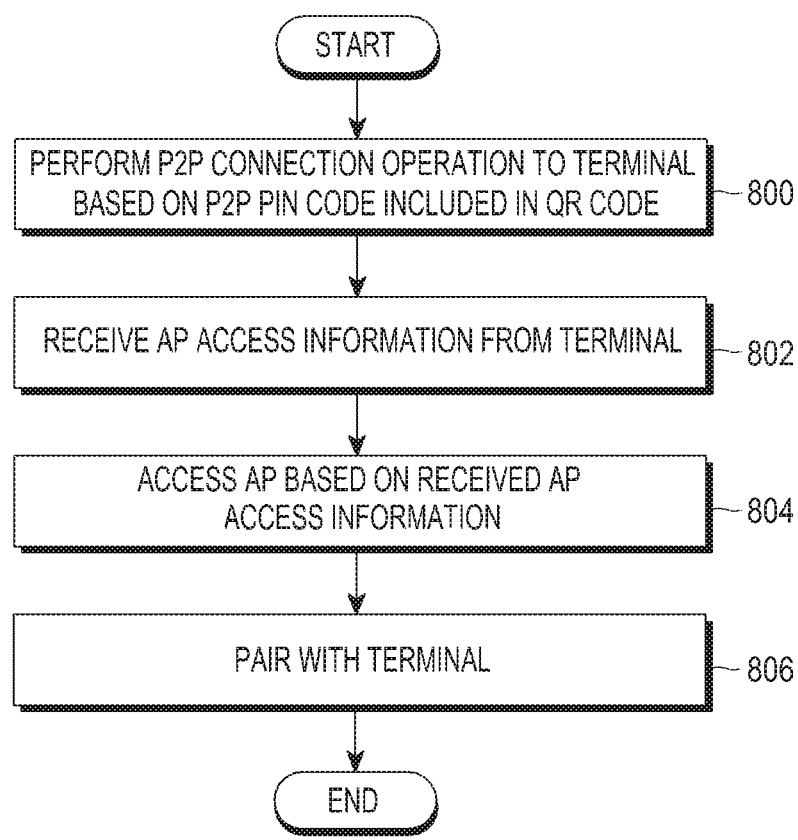
FIG. 8 is a flowchart illustrating an operation of a wireless device according to the second embodiment of the present disclosure.

FIG. 8 is a flowchart illustrating an operation of a wireless device according to the second embodiment of the present disclosure.

Referring to FIG. 8, in operation 800, the wireless device 500 may perform a P2P connection operation to the terminal 510 based on the P2P PIN code and Wi-Fi MAC address included in the QR code 505. The wireless device 500 may receive AP access information from the terminal 510 in operation 802, and access the AP 520 based on the received AP access information in operation 804. Thereafter, upon receiving a pairing request by the terminal 510, the wireless device 500 may pair with the terminal 510 in operation 806.

Next, a description will be made of the third embodiment of the present disclosure, in which a terminal performing Wi-Fi communication registers a wireless device performing Zigbee communication.

Figure 9:
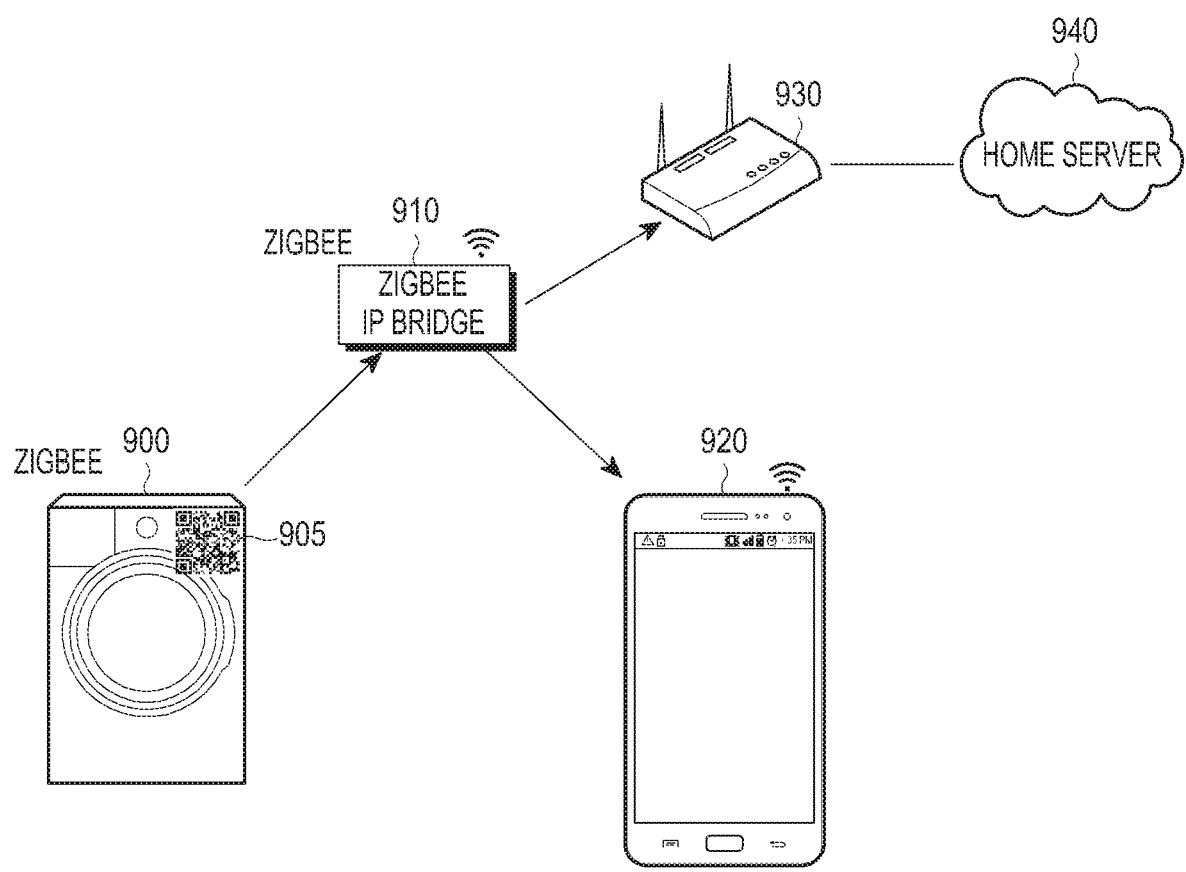
FIG. 9 illustrates a wireless communication system according to a third embodiment of the present disclosure.

FIG. 9 illustrates a wireless communication system according to a third embodiment of the present disclosure.

Referring to FIG. 9, the wireless communication system according to the third embodiment of the present disclosure may be configured in the form of a home network, which includes a wireless device 900, a Zigbee IP bridge 910, a terminal 920, an AP 930, a home server 940, and may include other similar and/or suitable devices.

The wireless device 900 may perform Zigbee communication, and include a recognition code including device information and the like. The recognition code may be a 2D recognition code. The recognition code may correspond to, for example, a QR code 905 and the like, and for convenience of description, the recognition code will be referred to herein as a QR code 905.

In the third embodiment of the present disclosure, the QR code 905 may include connectivity type information indicating the wireless communication type such as Zigbee and the like, a Zigbee MAC address, a security key (e.g., an install key and the like; hereinafter the security key will be referred to as an install key), URI information for download of an application, and the like. The above information may be encrypted and then stored in the QR code 905, and the URI information may be recorded in accordance with the QR standard.

The terminal 920, a device capable of performing Wi-Fi communication, may obtain information included in the QR code 905 by scanning the QR code 905. The terminal 920 may perform a registration procedure for the wireless device 900 through the Zigbee IP bridge 910 based on the information obtained from the QR code 905.

The Zigbee IP bridge 910 is a device for connecting the Wi-Fi communication network to the Zigbee communication network. The AP 930 may be connected to the home server 940 and perform communication with the external network. The home server 940 may be connected to the external network, and manage information about a variety of devices in the home network.

Figure 10:
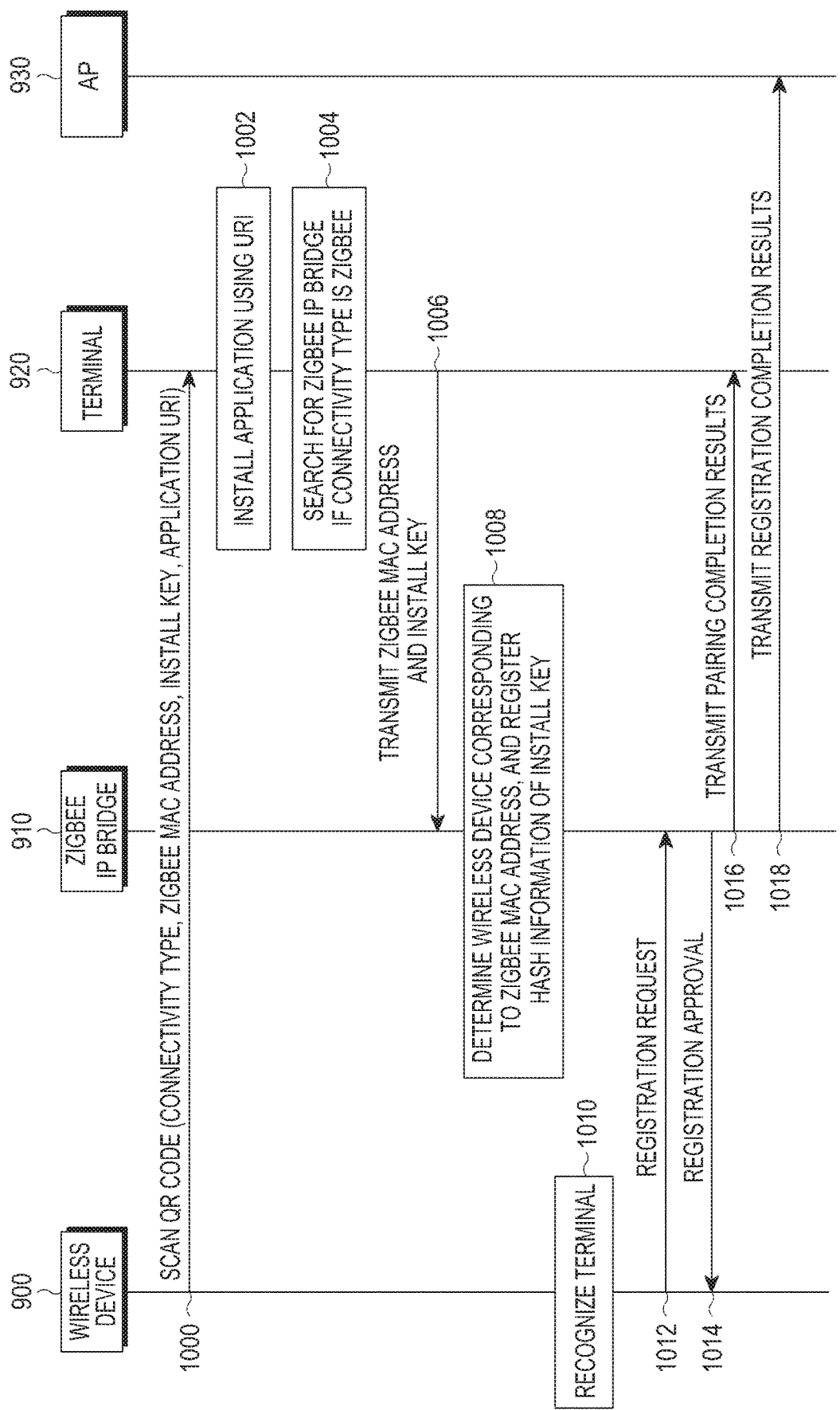
FIG. 10 is a signaling diagram illustrating a process of registering a wireless device in a wireless communication system according to the third embodiment of the present disclosure.

FIG. 10 is a signaling diagram illustrating a process of registering a wireless device in a wireless communication system according to the third embodiment of the present disclosure.

Referring to FIG. 10, in operation 1000, the terminal 920 may obtain information about connectivity type, Zigbee MAC address, install key, application URI and the like by scanning the QR code 950 included in the wireless device 900. In operation 1002, the terminal 920 may download and install an application using the URI information. The application may correspond to an application used for searching for and registering of the wireless device 900, and the terminal 920 may download the application through the AP 930.

The terminal 920 may execute the application and determine the connectivity type included in the QR code 905. In operation 1004, the terminal 920 may search for the Zigbee IP bridge 910 if the connectivity type is determined to be Zigbee. An operation of searching for the Zigbee IP bridge 910 may be performed through a service discovery scheme that uses the SSDP or another discovery protocol.

Upon detecting the Zigbee IP bridge 910, the terminal 920 may transmit the Zigbee MAC address and the install key to the Zigbee IP bridge 910 in operation 1006. In operation 1008, the Zigbee IP bridge 910 may store information about a wireless device corresponding to the Zigbee MAC address and hash information of the install key. For example, the Zigbee IP bridge 910 may register the hash information in a Zigbee communication modem of the Zigbee IP bridge 910.

Upon recognizing the terminal 920 in operation 1010, the wireless device 900 may transmit a registration request message including information about the wireless device 900 to the Zigbee IP bridge 910 in operation 1012. In operation 1014, the Zigbee IP bridge 910 may approve registration for the terminal 920 based on the stored information and transmit a registration approval message to the wireless device 900. The wireless device 900 may recognize the terminal 920 using short-range wireless communication such as a proximity sensor, near field communication (NFC) and the like.

In operation 1016, the Zigbee IP bridge 910 may transmit the pairing completion results indicating its connection to the wireless device 900, to the terminal 920 via the Wi-Fi interface. In operation 1018, the Zigbee IP bridge 910 may transmit the registration completion results including information about the wireless device 900 to the home server 940 in order to register the wireless device 900 in the home network.

Next, reference will be made to FIGS. 11 to 13, to describe operations of the terminal 920, the Zigbee IP bridge 910 and the wireless device 900 according to the third embodiment of the present disclosure, respectively.

Figure 11:
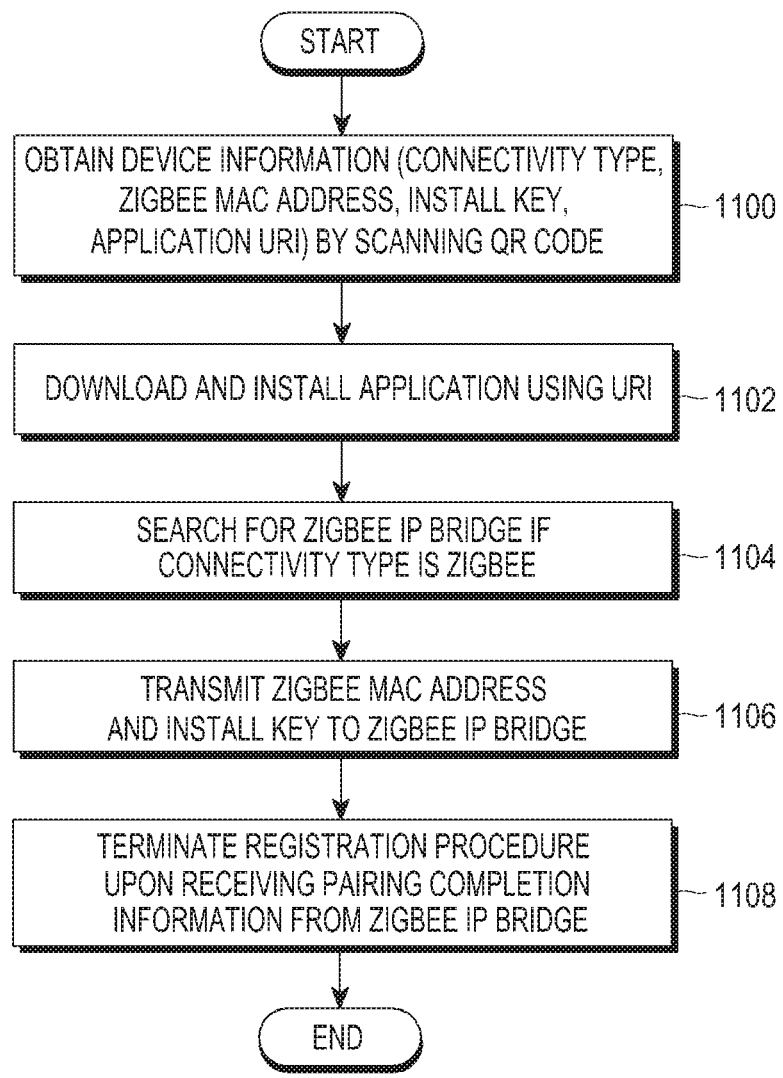
FIG. 11 is a flowchart illustrating an operation of a terminal according to the third embodiment of the present disclosure.

FIG. 11 is a flowchart illustrating an operation of a terminal according to the third embodiment of the present disclosure.

Referring to FIG. 11, in operation 1100, the terminal 920 may obtain device information (e.g., connectivity type, Zigbee MAC address, install key, and application URI) by scanning the QR code 905. In operation 1102, the terminal 920 may download and install an application using the URI.

In operation 1104, the terminal 920 may execute the application, and search for the Zigbee IP bridge 910 if the connectivity type corresponds to Zigbee. Upon detecting the Zigbee IP bridge 910, the terminal 920 may transmit the Zigbee MAC address and install key information to the detected Zigbee IP bridge 910 in operation 1106.

In operation 1108, upon receiving pairing completion information from the Zigbee IP bridge 910, the terminal 920 may register the wireless device 900 and terminate the registration procedure.

Figure 12:
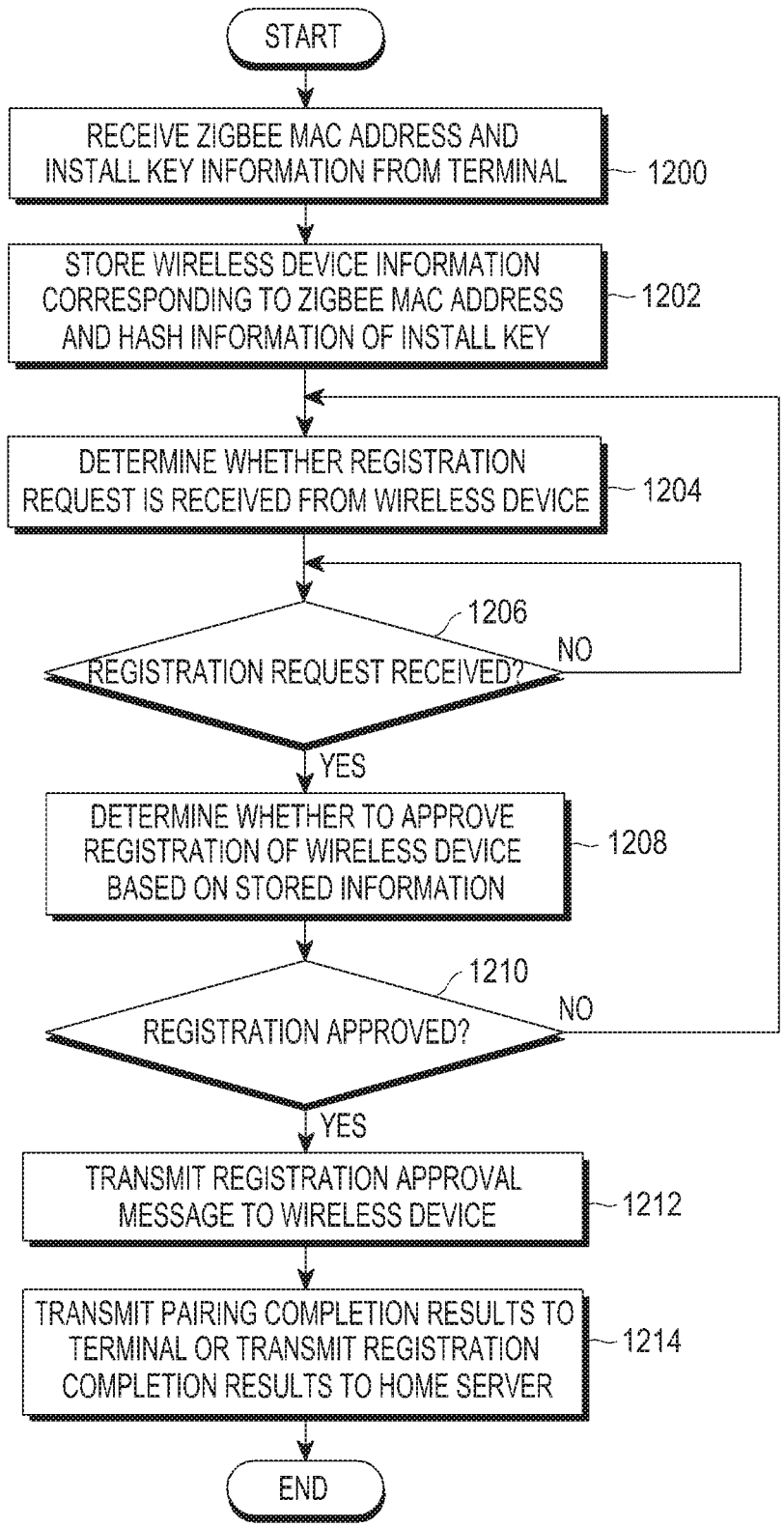
FIG. 12 is a flowchart illustrating an operation of a Zigbee internet protocol (IP) bridge according to the third embodiment of the present disclosure.

FIG. 12 is a flowchart illustrating an operation of a Zigbee IP bridge according to the third embodiment of the present disclosure.

Referring to FIG. 12, in operation 1200, the Zigbee IP bridge 910 may receive a Zigbee MAC address and an install key from the terminal 920. In operation 1202, the Zigbee IP bridge 910 may store hash information of the install key together with the information about a wireless device corresponding to the Zigbee MAC address.

In operation 1204, the Zigbee IP bridge 910 may determine whether a registration request is received from the wireless device 900. Upon receiving the registration request in operation 1206, the Zigbee IP bridge 910 may determine whether to approve registration of the wireless device 900 based on the stored information, in operation 1208.

If the Zigbee IP bridge 910 determines to approve registration of the wireless device 900 in operation 1210, the Zigbee IP bridge 910 may transmit a registration approval message to the wireless device 900 in operation 1212. In operation 1214, the Zigbee IP bridge 910 may transmit the pairing completion results to the terminal 920, or transmit the registration completion results to the home server 940.

Figure 13:
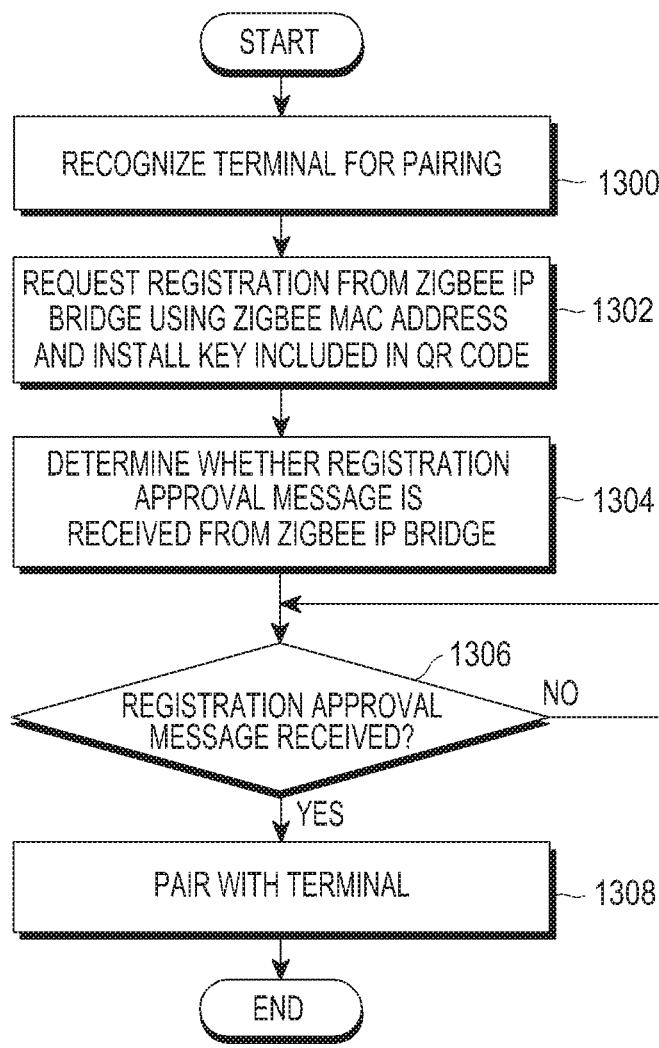
FIG. 13 is a flowchart illustrating an operation of a wireless device according to the third embodiment of the present disclosure.

FIG. 13 is a flowchart illustrating an operation of a wireless device according to the third embodiment of the present disclosure.

Referring to FIG. 13, upon recognizing the terminal 920 for pairing in operation 1300, the wireless device 900 may transmit a registration request message to the Zigbee IP bridge 910 using a Zigbee MAC address and an install key included in the QR code 905 in operation 1302. In operation 1304, the wireless device 900 may determine whether a registration approval message is received from the Zigbee IP bridge 910. Upon receiving the registration approval message in operation 1306, the wireless device 900 may perform pairing with the terminal 920 in operation 1308.

Next, a description will be made of the fourth embodiment of the present disclosure, in which a terminal performing Wi-Fi communication registers a wireless device performing Z-wave communication.

Figure 14:
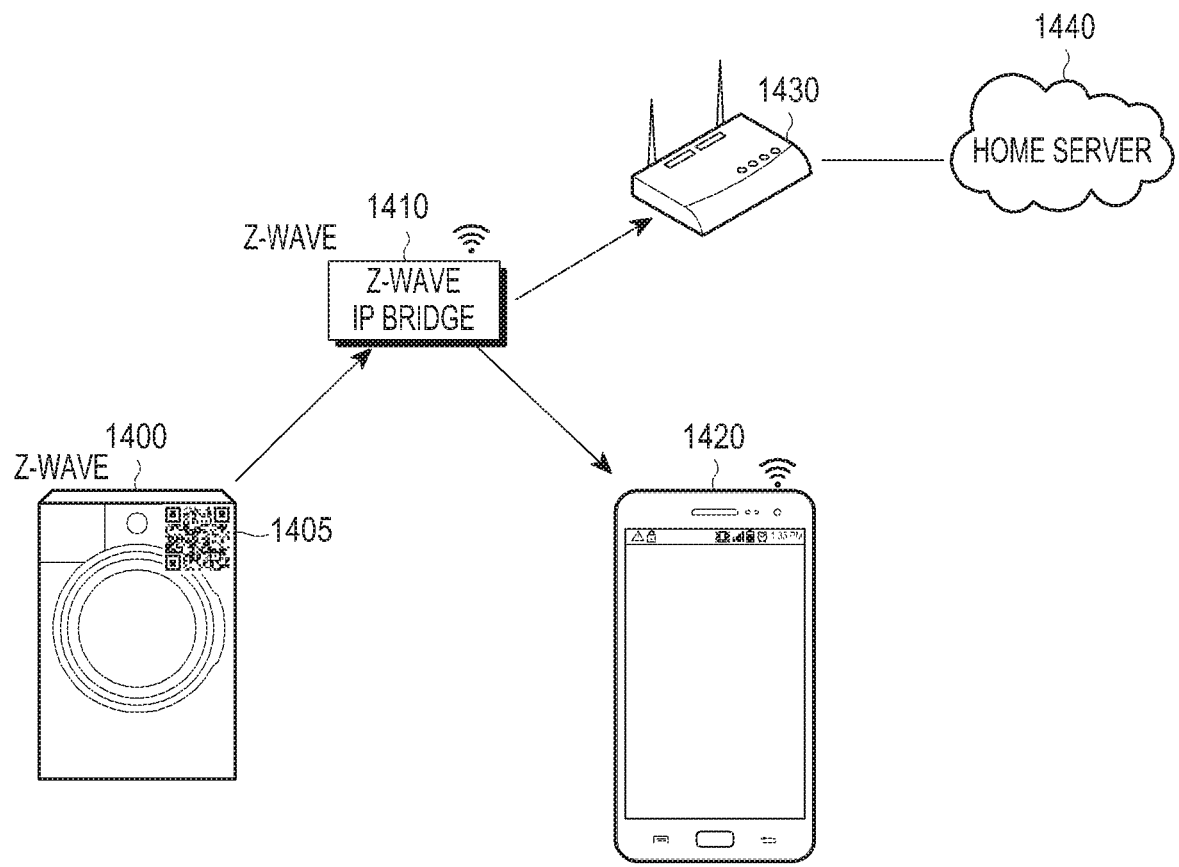
FIG. 14 illustrates a wireless communication system according to a fourth embodiment of the present disclosure.

FIG. 14 illustrates a wireless communication system according to a fourth embodiment of the present disclosure.

Referring to FIG. 14, the wireless communication system according to the fourth embodiment of the present disclosure may be configured in the form of a home network, which includes a wireless device 1400, a Z-wave IP bridge 1410, a terminal 1420, an AP 1430, a home server 1440, and may include other similar and/or suitable devices.

The wireless device 1400 may perform Z-wave communication, and include a recognition code including device information and the like. The recognition code may be a 2D recognition code. The recognition code may correspond to, for example, a QR code 1405 and the like, and for convenience of description, the recognition code will be referred to herein as a QR code 1405.

In the fourth embodiment of the present disclosure, the QR code 1405 may include connectivity type information indicating the wireless communication type such as Z-wave and the like, a Z-wave Secure Remote Password (SRP), URI information for download of an application, and the like. The above information may be encrypted and then stored in the QR code 1405, and the URI information may be recorded in accordance with the QR standard.

The terminal 1420, a device capable of performing Wi-Fi communication, may obtain information included in the QR code 1405 by scanning the QR code 1405. The terminal 1420 may perform a registration procedure for the wireless device 1400 through the Z-wave IP bridge 1410 based on the information obtained from the QR code 1405.

The Z-wave IP bridge 1410 is a device for connecting the Wi-Fi communication network to the Z-wave communication network. The AP 1430 may be connected to the home server 1440 and perform communication with the external network. The home server 1440 may be connected to the external network, and manage information about a variety of devices in the home network.

Figure 15:
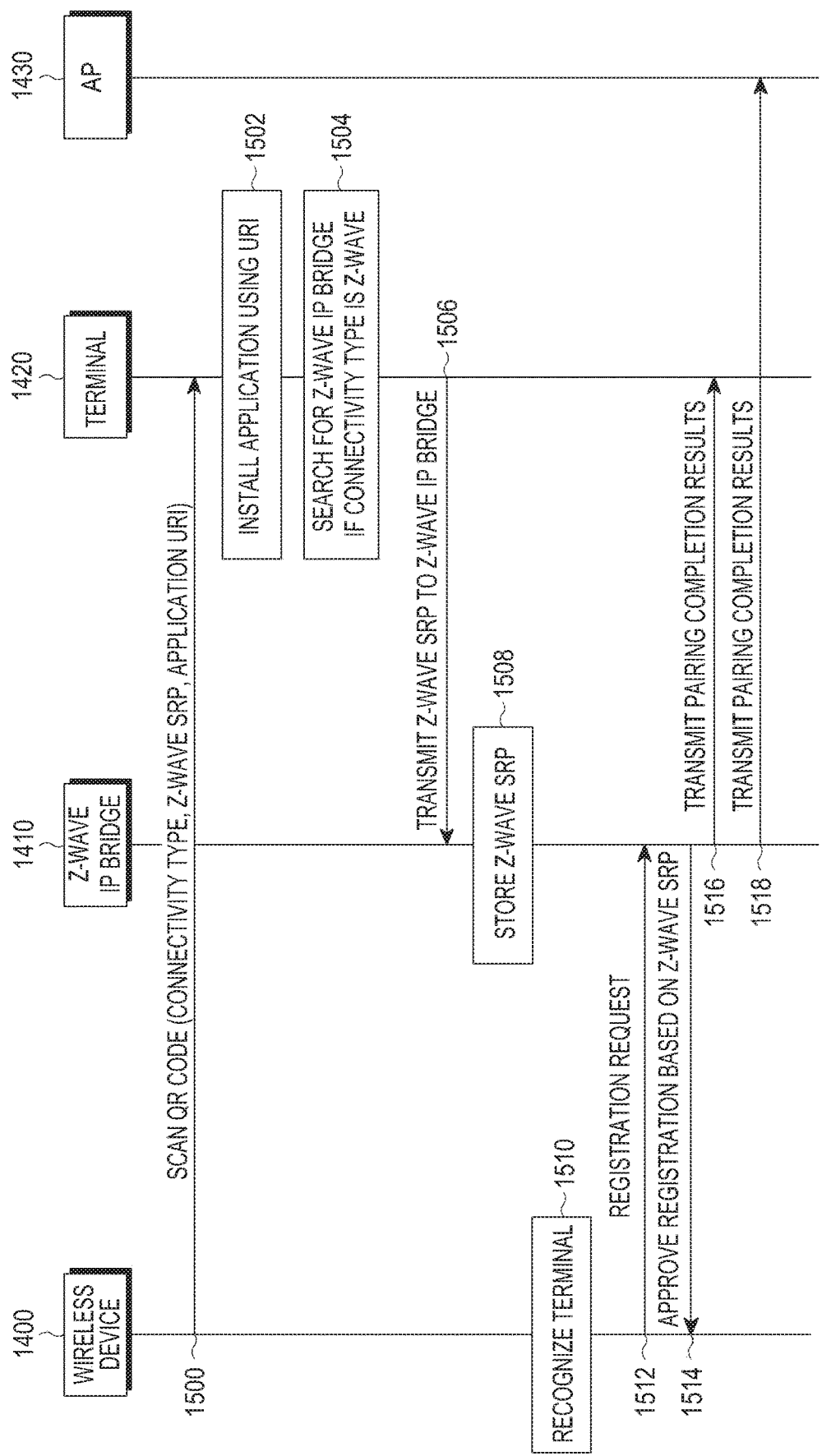
FIG. 15 is a signaling diagram illustrating a process of registering a wireless device in a wireless communication system according to the fourth embodiment of the present disclosure.

FIG. 15 is a signaling diagram illustrating a process of registering a wireless device in a wireless communication system according to the fourth embodiment of the present disclosure.

Referring to FIG. 15, in operation 1500, the terminal 1420 may obtain information about connectivity type, Z-wave SRP, application URI and the like by scanning the QR code 1450 included in the wireless device 1400. In operation 1502, the terminal 1420 may download and install an application using the URI information. The application may correspond to an application used for searching for and registering of the wireless device 1400, and the terminal 1420 may download the application through the AP 1430.

The terminal 1420 may execute the application. In operation 1504, the terminal 1420 may search for the Z-wave IP bridge 1410 if the connectivity type included in the QR code 1405 corresponds to Z-wave. An operation of searching for the Z-wave IP bridge 1410 may be performed through a service discovery scheme that uses the SSDP or another discovery protocol.

Upon detecting the Z-wave IP bridge 1410, the terminal 1420 may transmit the Z-wave SRP to the Z-wave IP bridge 1410 in operation 1506. In operation 1508, the Z-wave IP bridge 1410 may store the Z-wave SRP.

Upon recognizing the terminal 1420 in operation 1510, the wireless device 1400 may transmit a registration request to the Z-wave IP bridge 1410 in operation 1512. In operation 1514, the Z-wave IP bridge 1410 may approve registration for the terminal 1420 based on the stored Z-wave SRP information. The wireless device 1400 may recognize the terminal 1420 using short-range wireless communication such as a proximity sensor, NFC and the like.

In operation 1516, the Z-wave IP bridge 1410 may transmit the pairing completion results indicating its connection to the wireless device 1400, to the terminal 1420 via the Wi-Fi interface. In operation 1518, the Z-wave IP bridge 1410 may transmit the registration completion results including information about the wireless device 1400 to the home server 1440 in order to register the wireless device 1400 in the home network.

Next, reference will be made to FIGS. 16 to 18, to describe operations of the terminal 1420, the Z-wave IP bridge 1410 and the wireless device 1400 according to the fourth embodiment of the present disclosure, respectively.

Figure 16:
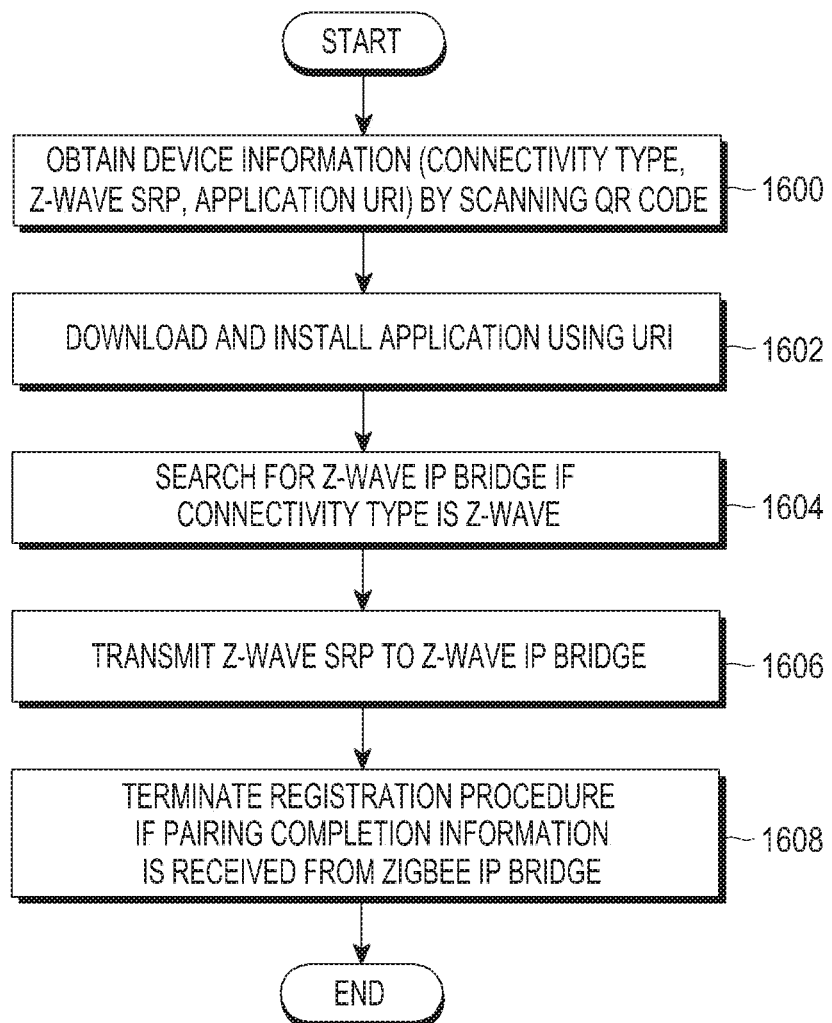
FIG. 16 is a flowchart illustrating an operation of a terminal according to the fourth embodiment of the present disclosure.

FIG. 16 is a flowchart illustrating an operation of a terminal according to the fourth embodiment of the present disclosure.

Referring to FIG. 16, in operation 1600, the terminal 1420 may obtain device information (e.g., connectivity type, Z-wave SRP, and application URI) by scanning the QR code 1405. In operation 1602, the terminal 1420 may download and install an application using the URI.

In operation 1604, the terminal 1420 may execute the application and search for the Z-wave IP bridge 1410 if the connectivity type corresponds to Z-wave. Upon detecting the Z-wave IP bridge 1410, the terminal 1420 may transmit the Z-wave SRP to the detected Z-wave IP bridge 1410 in operation 1606.

In operation 1608, upon receiving pairing completion information from the Z-wave IP bridge 1410, the terminal 1420 may register the wireless device 1400 and terminate the registration procedure.

Figure 17:
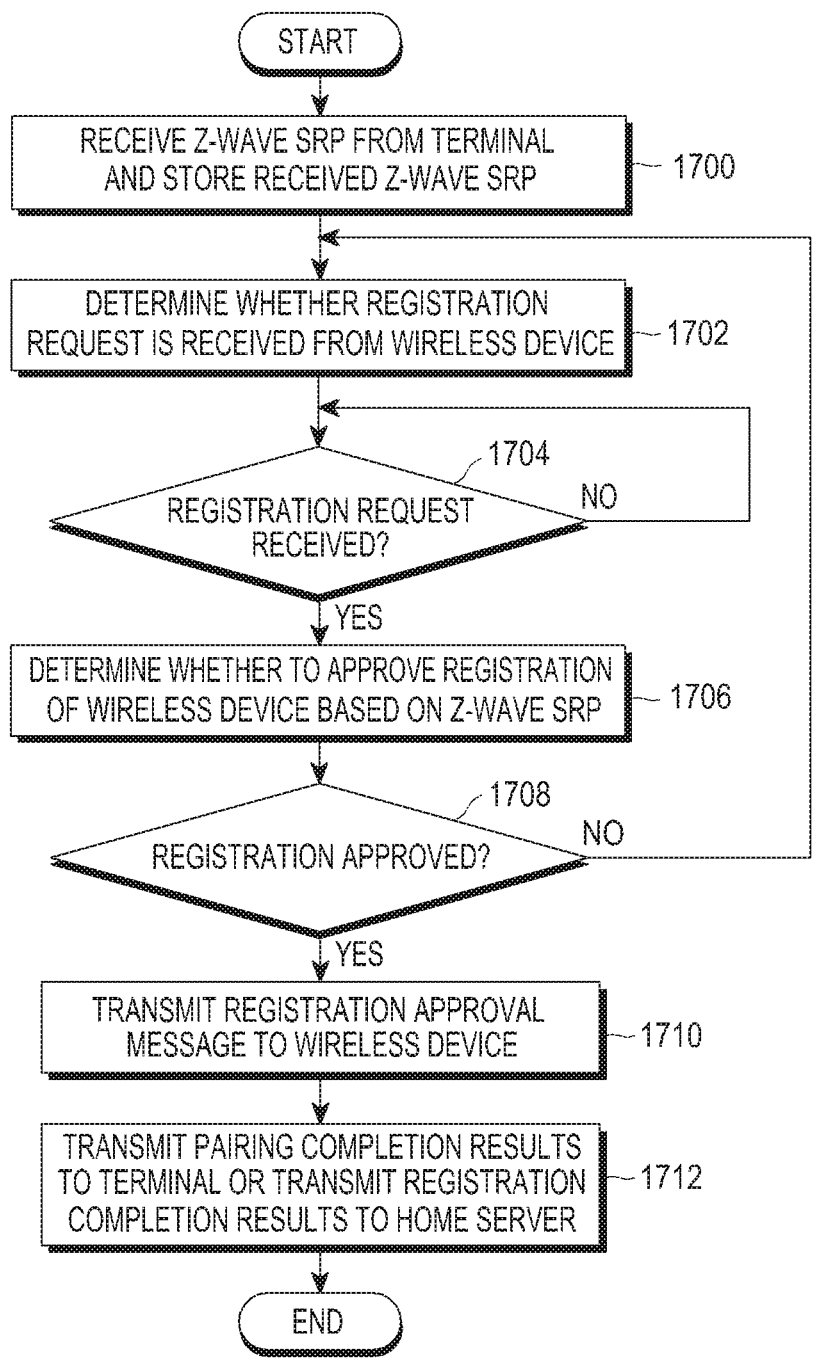
FIG. 17 is a flowchart illustrating an operation of a Z-wave IP bridge according to the fourth embodiment of the present disclosure.

FIG. 17 is a flowchart illustrating an operation of a Z-wave IP bridge according to the fourth embodiment of the present disclosure.

Referring to FIG. 17, the Z-wave IP bridge 1410 may receive a Z-wave SRP from the terminal 1420 and store the Z-wave SRP in operation 1700.

The Z-wave IP bridge 1410 may determine in operation 1702 whether a registration request is received from the wireless device 1400. Upon receiving the registration request in operation 1704, the Z-wave IP bridge 1410 may determine in operation 1706 whether to approve registration of the wireless device 1400 based on the stored Z-wave SRP information.

If the Z-wave IP bridge 1410 determines to approve registration of the wireless device 1400 in operation 1708, the Z-wave IP bridge 1410 may transmit a registration approval message to the wireless device 1400 in operation 1710. In operation 1712, the Z-wave IP bridge 1410 may transmit the pairing completion results to the terminal 1420, or transmit the registration completion results to the home server 1440.

Figure 18:
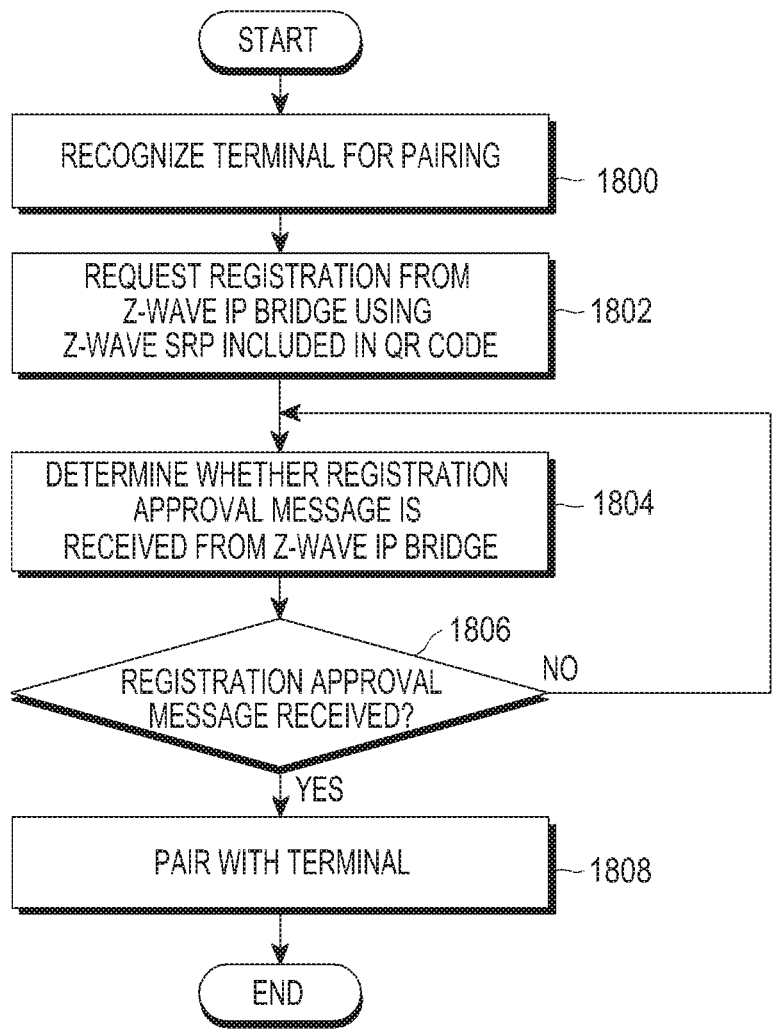
FIG. 18 is a flowchart illustrating an operation of a wireless device according to the fourth embodiment of the present disclosure.

FIG. 18 is a flowchart illustrating an operation of a wireless device according to the fourth embodiment of the present disclosure.

Referring to FIG. 18, upon recognizing the terminal 1420 for pairing in operation 1800, the wireless device 1400 may transmit a registration request message to the Z-wave IP bridge 1410 using a Z-wave SRP included in the QR code 1405 in operation 1802. The wireless device 1400 may determine in operation 1804 whether a registration approval message is received from the Z-wave IP bridge 1410. Upon receiving the registration approval message in operation 1806, the wireless device 1400 may perform pairing with the terminal 1420 in operation 1808.

Figure 19:
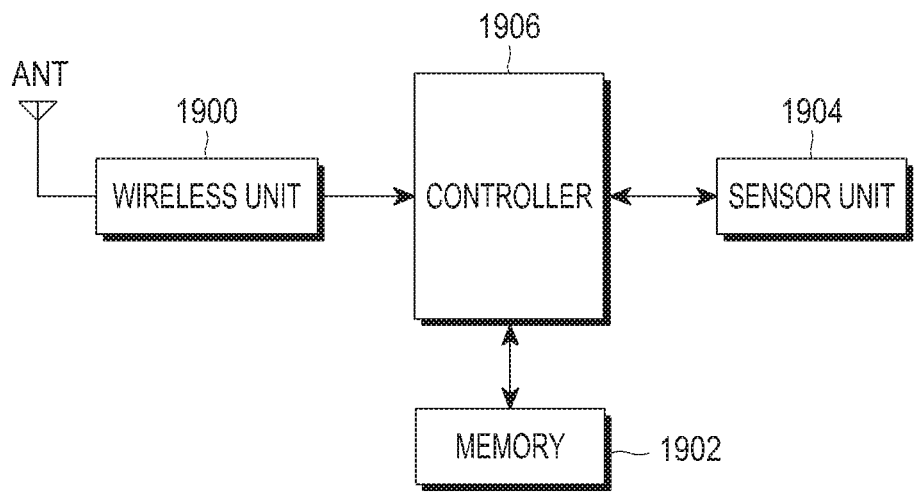
FIG. 19 is a block diagram of a wireless device according to an embodiment of the present disclosure.

FIG. 19 is a block diagram of a wireless device according to an embodiment of the present disclosure.

Referring to FIG. 19, the wireless device may include a wireless unit 1900, a memory 1902, a sensor unit 1904, a controller 1906, and may include other similar and/or suitable devices.

The wireless unit 1900 is a component for wireless communication of the wireless device. The wireless unit 1900 may include at least one of a Wi-Fi interface for Wi-Fi communication, a Zigbee interface for Zigbee communication, and a Z-wave interface for Z-wave communication.

The memory 1902 may store a variety of information and data that are generated during an operation of the wireless device.

The sensor unit 1904 may determine whether a specific device such as a terminal and the like is adjacent to the wireless device, and output the determination results. For example, the sensor unit 1904 may be configured in various types such as an infrared sensor, a motion sensor and the like.

The controller 1906 may control the overall operation of the wireless device by controlling the wireless unit 1900, the memory 1902 and the sensor unit 1904. In particular, the controller 1906 may control the above components such that the operation of the wireless device may be performed according to the first to fourth embodiments of the present disclosure.

Figure 20:
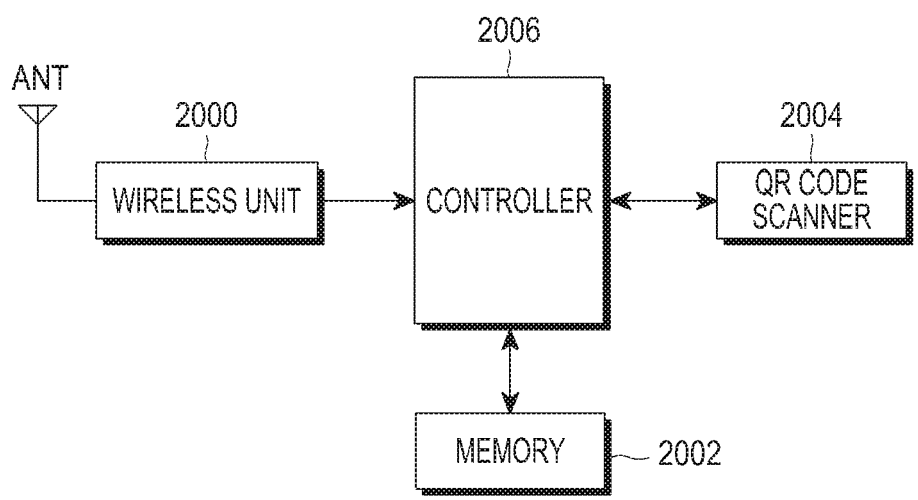
FIG. 20 is a block diagram of a terminal according to an embodiment of the present disclosure.

FIG. 20 is a block diagram of a terminal according to an embodiment of the present disclosure.

Referring to FIG. 20, the terminal may include a wireless unit 2000, a memory 2002, a QR code scanner 2004, a controller 2006, and may include other similar and/or suitable devices.

The wireless unit 1900 is a component for wireless communication of the terminal. The wireless unit 2000 may include a Wi-Fi interface for Wi-Fi communication, and an interface for Long Term Evolution (LTE) communication.

The memory 2002 may store a variety of information and data that are generated during an operation of the terminal. In particular, the memory 2002 may store the information included in the QR code that is scanned from the wireless device.

The QR code scanner 2004, which is a component for scanning a QR code included in the wireless device, may include, for example, a camera and the like.

The controller 2006 may control the overall operation of the terminal by controlling the wireless unit 2000, the memory 2002 and the QR code scanner 2004. In particular, the controller 2006 may control the above components such that the operation of the terminal may be performed according to the first to fourth embodiments of the present disclosure.

It can be appreciated that the method and apparatus according to embodiments of the present disclosure may be implemented in the form of hardware, software or a combination thereof. The software may be stored in a volatile or nonvolatile storage device (e.g., an erasable/re-writable read-only memory (ROM) or the like), a memory (e.g., a random access memory (RAM), a memory chip, a memory integrated circuit (IC) or the like), or an optically or magnetically recordable machine (e.g., computer)-readable storage medium (e.g., compact disk (CD), digital versatile disk (DVD), magnetic disk, magnetic tape or the like). The method according to embodiments of the present disclosure may be implemented by a computer or a portable terminal, which includes a controller and a memory. It can be noted that the memory is an example of the machine-readable storage medium suitable to store a program or programs including instructions for implementing embodiments of the present disclosure.

Therefore, the present disclosure may include a program including codes for implementing the method and apparatus as defined by the appended claims and their equivalents, and also include a non-transitory machine (e.g., computer or the like)-readable storage medium storing the program. In addition, the program may be electronically carried on any media such as communication signals that are transmitted through wired/wireless connections.

As is apparent from the foregoing description, according to embodiments of the present disclosure, the information (e.g., Wi-Fi MAC address, and SSID and password for tethering connection in the case of Wi-Fi; Zigbee MAC address and install key in the case of Zigbee; and SRP key and URI for download of an application in the case of Z-wave) needed for the registration procedure may be stored in the QR code mounted on a wireless device, thereby to omit the input procedure which was conventionally performed by the user, making it possible to perform the fast and easy device registration procedure.

In the case of a Zigbee wireless device, if a security scheme such as an elliptic curve cryptography (ECC) scheme or the like is used, a security key input procedure for an install key or the like is required. However, in accordance with an embodiment of the present disclosure, the security key included in the QR code may be transmitted to the Zigbee bridge that is connected to the Zigbee wireless device, so the security key input procedure may be omitted.

In an embodiment of the present disclosure, if the user scans the QR code of the wireless device to be registered, the device registration procedure may be automatically performed, so the user may conveniently pair the relevant devices. Further, in an embodiment of the present disclosure, each wireless device may be directly connected to the terminal since an individual SSID is used for each wireless device, making it possible to prevent other wireless devices except for the wireless device from being registered.

Moreover, if wireless communication such as Wi-Fi, Zigbee, Z-wave and the like is used, the user may perform pairing between wireless devices though intuitive user experience (UX). In addition, if switching is temporarily made from the STA mode to the AP mode during wireless device registration, the waiting time may increase in the registration procedure, and the SSID may be exposed to other users due to the use of the fixed SSID. However, in an embodiment of the present disclosure, the exposure may be prevented, improving the security, and the registration time may be reduced and the registration procedure may be simplified.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a first electronic device for facilitating a connection between a second electronic device and an access point, the method comprising:
obtaining, by the first electronic device, a quick response (QR) code on the second electronic device, the QR code being obtained by using a camera of the first electronic device;
based on the obtained QR code, identifying, by the first electronic device, connection information for establishing a connection between the first electronic device and the second electronic device, the connection information including identification information of the second electronic device;
establishing the connection between the first electronic device and the second electronic device based on the identified connection information;
transmitting, by the first electronic device, access information of the access point to the second electronic device over the established connection with the second electronic device; and
registering the second electronic device based at least on the second electronic device being connected to the access point, the registering of the second electronic device comprising registering using an application configured for the connection and the registering of the second electronic device, the application installed on the first electronic device,
wherein the access information of the access point is used by the second electronic device to establish the connection between the second electronic device and the access point, and
wherein the connection between the first electronic device and the second electronic device is established using the identified connection information, a wireless network with a network identifier indicated by an identifier (ID) included in the obtained QR code, and the application configured for the connection and the registering of the second electronic device.

2. The method of claim 1, wherein the registering of the second electronic device further comprises:
receiving a user input for indicating the second electronic device to be registered.

3. The method of claim 1, wherein the second electronic device is registered, via the access point, at a home server corresponding to the first electronic device.

4. The method of claim 1, further comprising:
establishing a connection with the access point to identify that the second electronic device is connected to the access point.

5. The method of claim 1, wherein the connection information further includes identification information to be used by the second electronic device to identify the first electronic device for establishing the connection between the first electronic device and the second electronic device.

6. The method of claim 1, wherein the identification information includes a service set identifier (SSID) and a password.

7. The method of claim 1, wherein the connection information further includes at least one of information about a connectivity type between the second electronic device and the first electronic device, a medium access control (MAC) address information of the second electronic device, or uniform resource identifier (URI) information related to an application to be used for establishing the connection.

8. The method of claim 7, wherein the MAC address information of the second electronic device is used for identifying the second electronic device among a plurality of electronic devices if the plurality of electronic devices are connected to the first electronic device.

9. The method of claim 1,
wherein the establishing of the connection with the second electronic device further comprises:
a tethering operation, and
wherein the identification information is used by the first electronic device for the tethering operation.

10. The method of claim 1, wherein the second electronic device is a home appliance and the first electronic device is a smart phone.

11. The method of claim 1, wherein the establishing of the connection between the first electronic device and the second electronic device further comprises establishing the connection between the first electronic device and the second electronic device in response to identifying the connection information for establishing communication between the first electronic device and the second electronic device.

12. A non-transitory computer-readable storage medium storing instructions which, when executed by at least one processor of a first electronic device, cause the first electronic device to:
obtain, by the first electronic device, a quick response (QR) code on a second electronic device, the QR code being obtained by using a camera of a first electronic device;
based on the obtained QR code, identify, by the first electronic device, connection information for establishing a connection between the first electronic device and the second electronic device;
establish the connection between the first electronic device and the second electronic device based on the identified connection information;
transmit, by the first electronic device, access information of an access point to the second electronic device over the established connection with the second electronic device; and
register the second electronic device based at least on the second electronic device being connected to the access point, the registering of the second electronic device comprising registering using an application configured for the connection and the registering of the second electronic device, the application installed on the first electronic device,
wherein the access information of the access point is used by the second electronic device to establish a connection between the second electronic device and the access point, and
wherein the connection between the first electronic device and the second electronic device is established using the identified connection information, a wireless network with a network identifier indicated by an identifier (ID) included in the obtained QR code, and the application configured for the connection and the registering of the second electronic device.

13. The non-transitory computer-readable storage medium of claim 12, wherein the second electronic device is registered, via the access point, at a home server corresponding to the first electronic device.

14. The non-transitory computer-readable storage medium of claim 12, wherein the instructions, when executed, cause the first electronic device to further establish a connection with the access point to identify that the second electronic device is connected the access point.

15. The non-transitory computer-readable storage medium of claim 12, wherein the connection information further includes identification information to be used by the second electronic device to identify the first electronic device for establishing the connection between the first electronic device and the second electronic device.

16. A system comprising:
a first electronic device; and
a second electronic device,
wherein the first electronic device is configured to:
obtain a quick response (QR) code on the second electronic device, the QR code being obtained by using a camera of the first electronic device,
based on the obtained QR code, identify connection information for establishing a connection between the first electronic device and the second electronic device,
establish the connection between the first electronic device and the second electronic device based on the identified connection information,
transmit access information of an access point to the second electronic device over the established connection with the second electronic device,
wherein the access information of the access point is used for the second electronic device to connect to the access point, and
register the second electronic device based at least on the second electronic device being connected to the access point, the registering of the second electronic device comprising registering using an application configured for the connection and the registering of the second electronic device, the application installed on the first electronic device,
wherein the second electronic device is configured to:
receive the access information of the access point from the first electronic device, and
establish a connection between the second electronic device and the access point based on the received access information of the access point, and
wherein the connection between the first electronic device and the second electronic device is established using the identified connection information, a wireless network with a network identifier indicated by an identifier (ID) included in the obtained QR code, and the application configured for the connection and the registering of the second electronic device.

17. The system of claim 16, wherein the access point is configured to:
receive, from the second electronic device, a request to establish a connection with the second electronic device, and
establish the connection with the second electronic device in response to receiving the request to establish the connection with the second electronic device.

* * * * *